FIG. IA
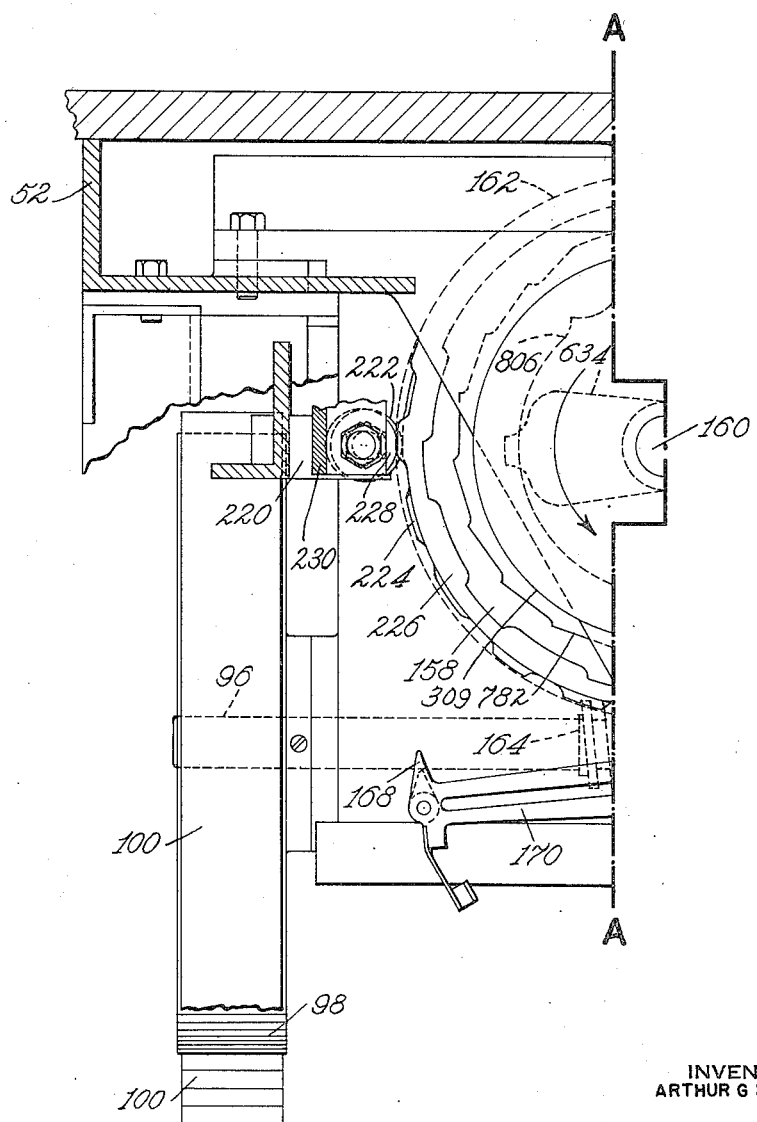
INVENTOR
ARTHUR G MIREL

Nov. 5, 1957 A. G. MIREL 2,811,939
BUTTON SEWING MACHINE
Filed Jan. 13, 1954 20 Sheets-Sheet 3
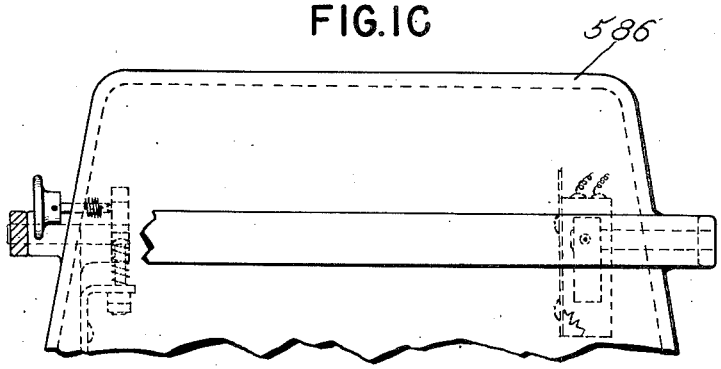
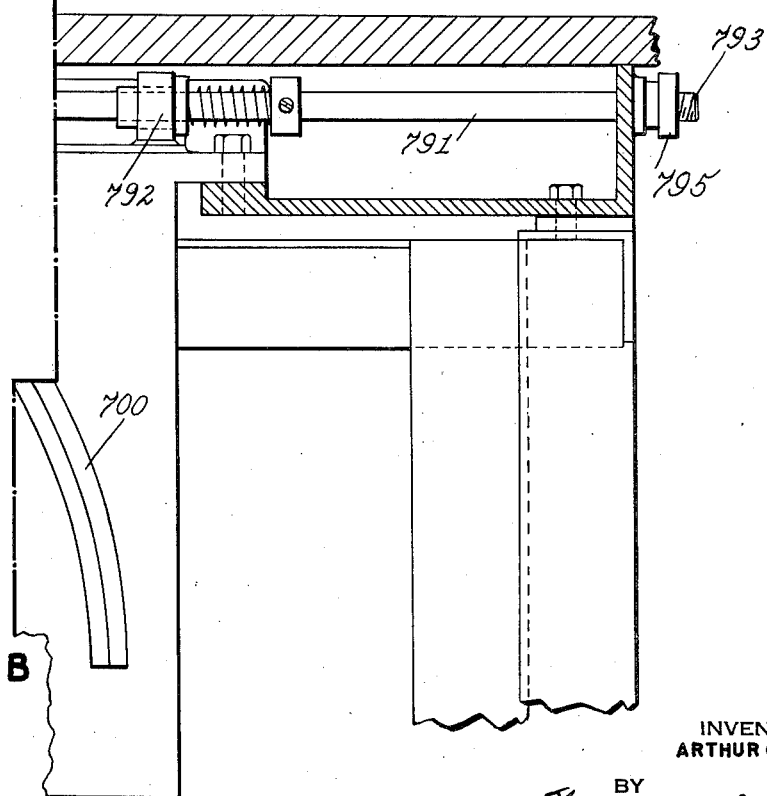
INVENTOR
ARTHUR G. MIREL
BY
ATTORNEY

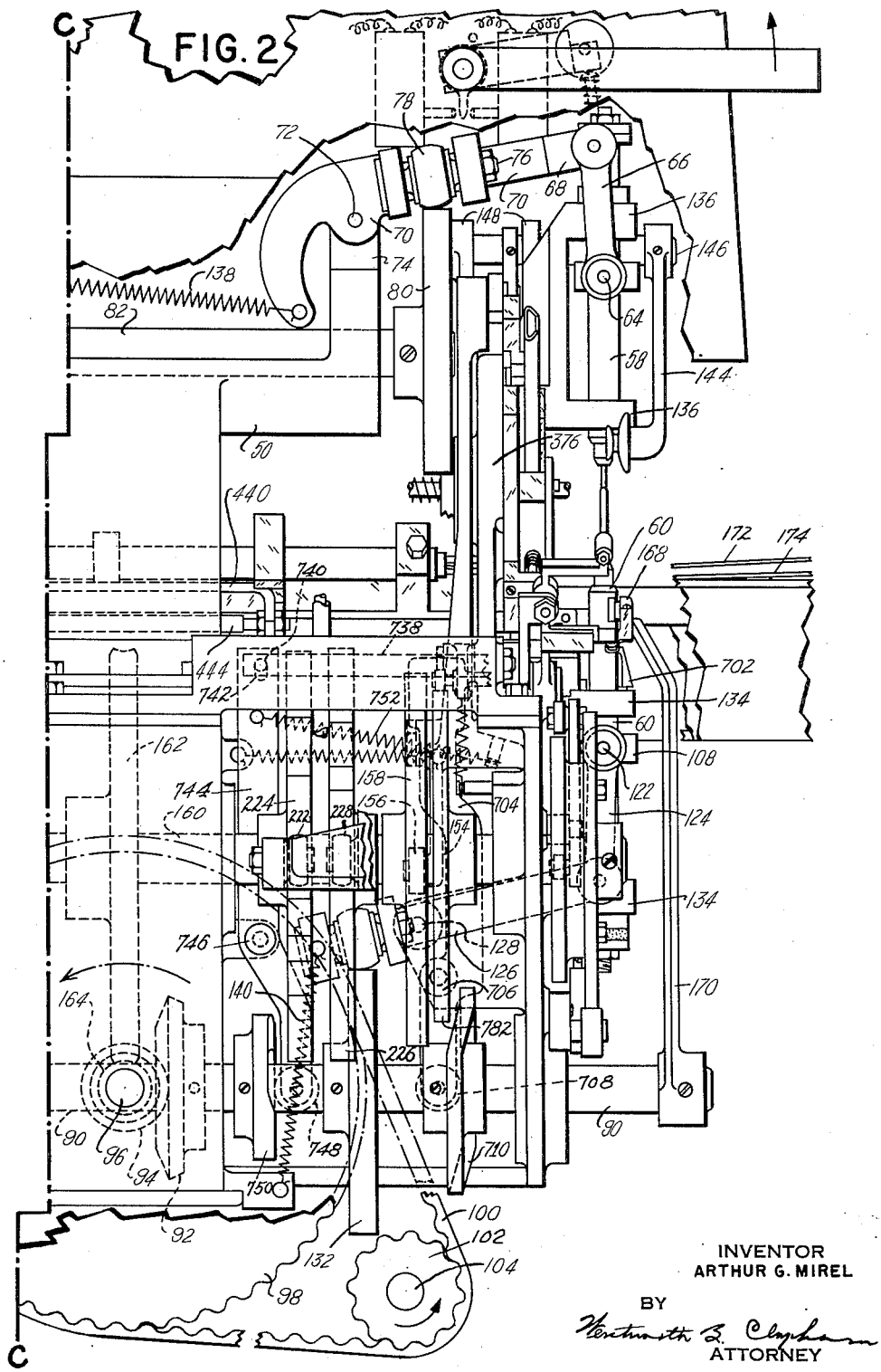

Nov. 5, 1957  A. G. MIREL  2,811,939
BUTTON SEWING MACHINE

Filed Jan. 13, 1954  20 Sheets-Sheet 5

INVENTOR
ARTHUR G. MIREL
BY
ATTORNEY

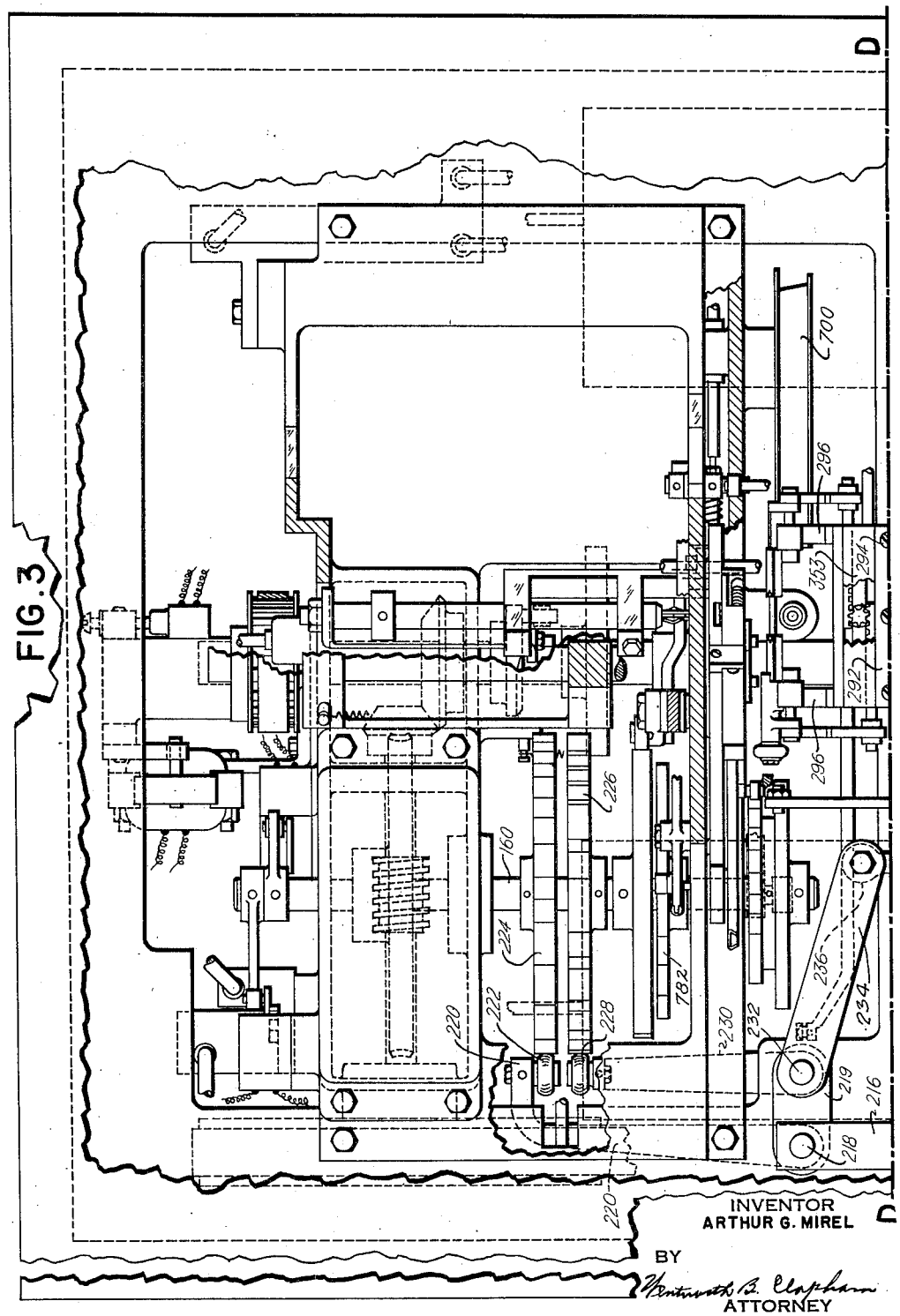

Nov. 5, 1957 A. G. MIREL 2,811,939
BUTTON SEWING MACHINE
Filed Jan. 13, 1954 20 Sheets-Sheet 7

INVENTOR
ARTHUR G. MIREL
BY
ATTORNEY

Nov. 5, 1957 A. G. MIREL 2,811,939
BUTTON SEWING MACHINE
Filed Jan. 13, 1954 20 Sheets-Sheet 8
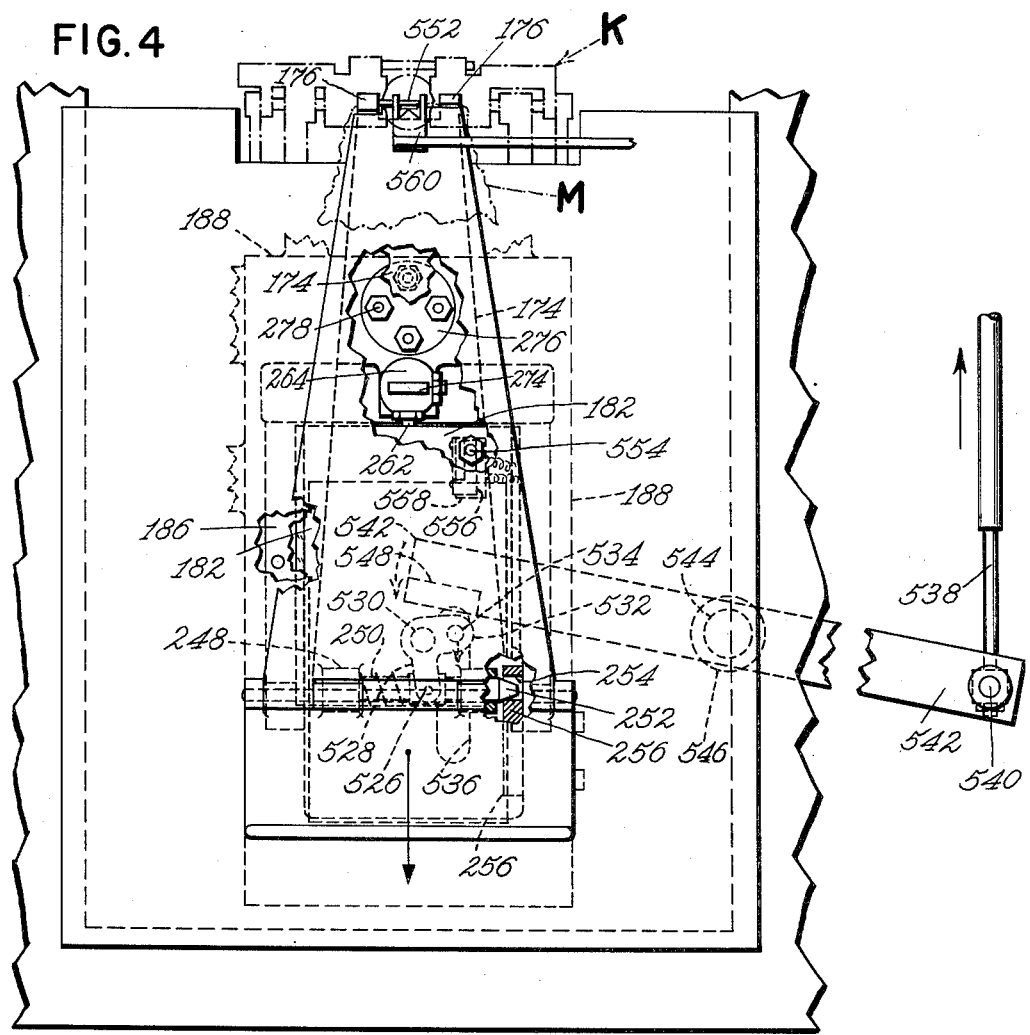
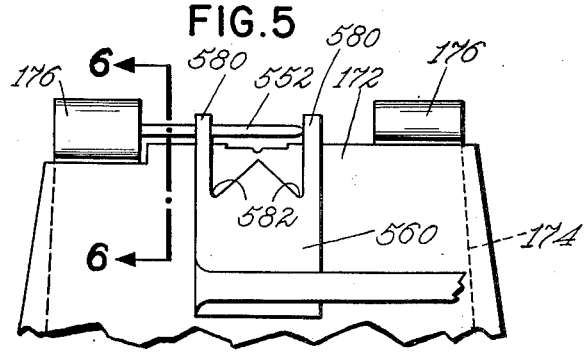
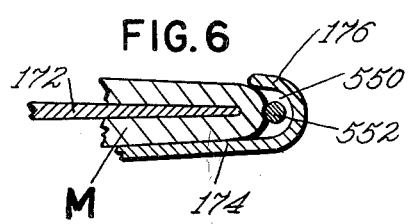
INVENTOR
ARTHUR G. MIREL
BY
ATTORNEY

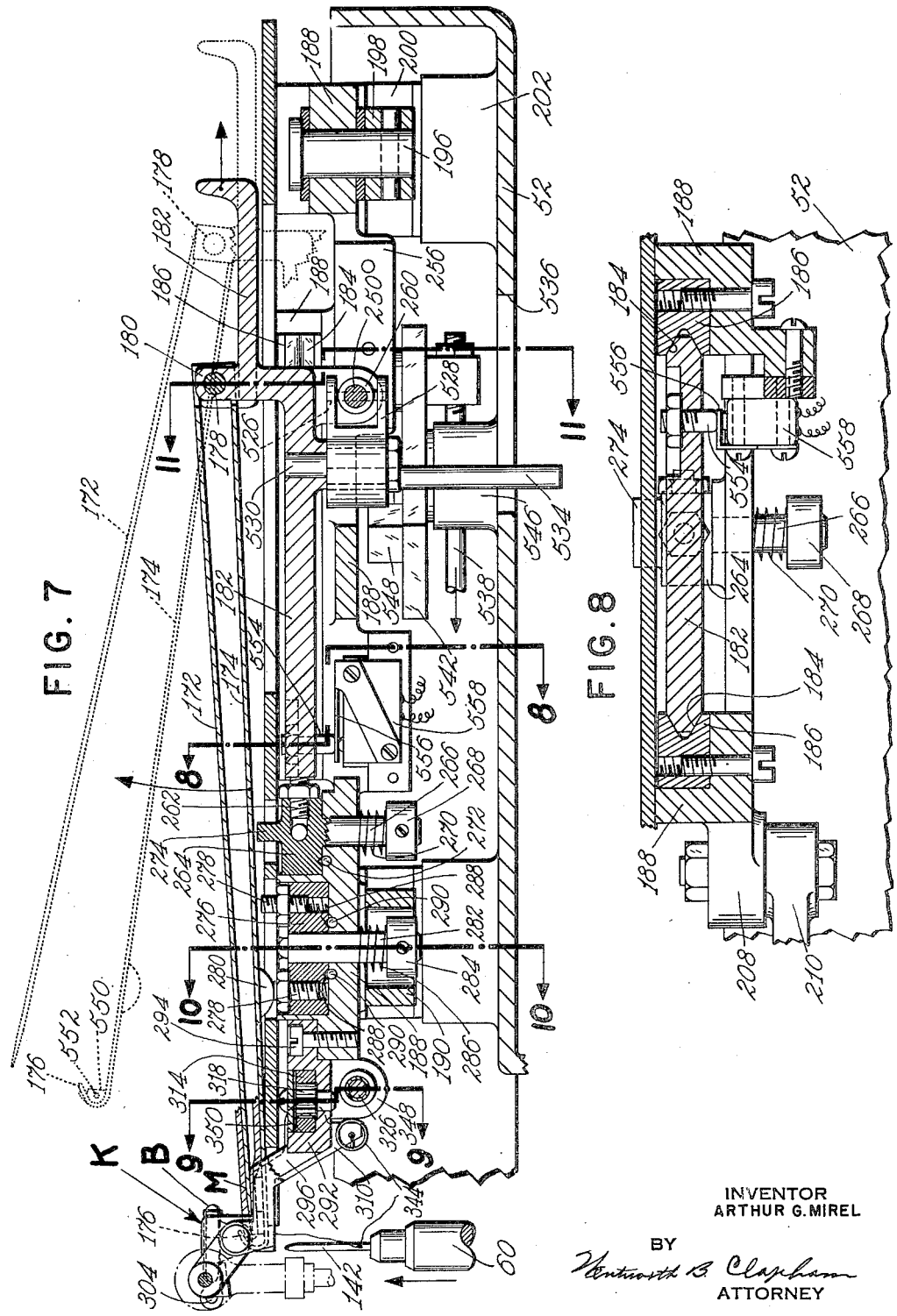

Nov. 5, 1957    A. G. MIREL    2,811,939
BUTTON SEWING MACHINE
Filed Jan. 13, 1954    20 Sheets-Sheet 10
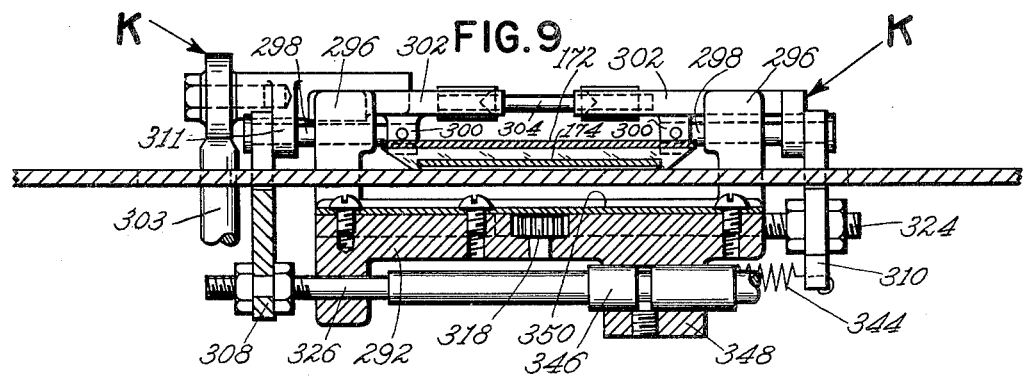
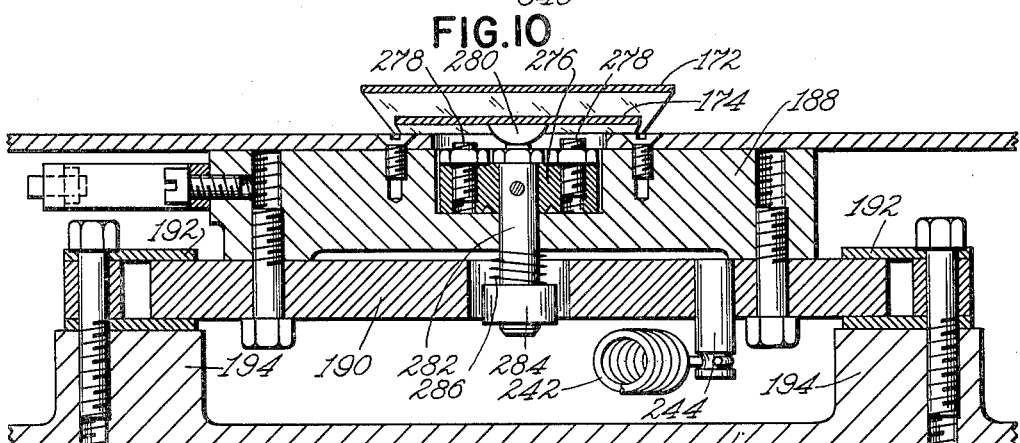
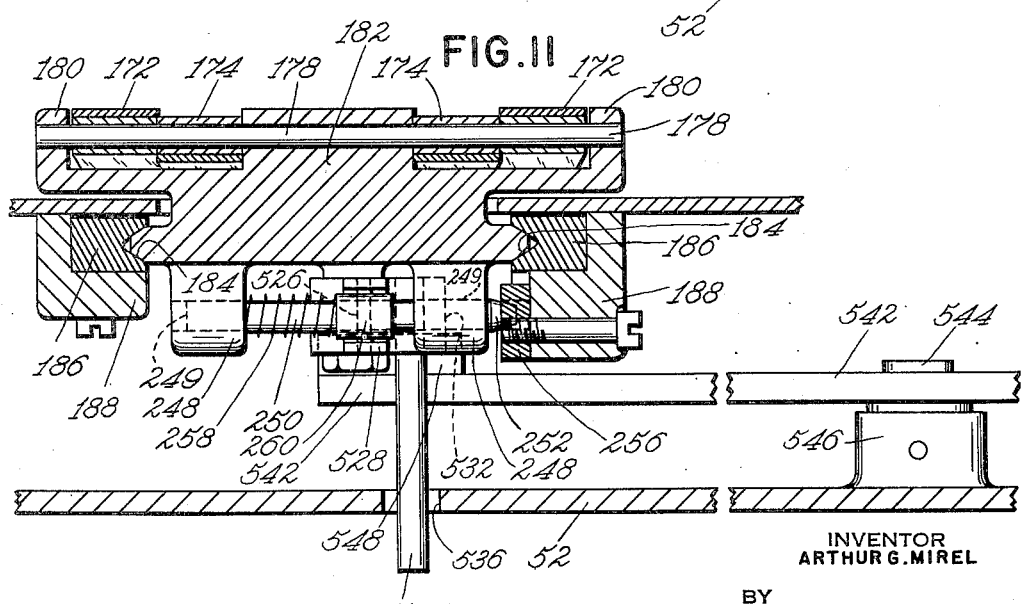
INVENTOR
ARTHUR G. MIREL
BY
ATTORNEY Nov. 5, 1957 — A. G. MIREL — 2,811,939
BUTTON SEWING MACHINE
Filed Jan. 13, 1954 — 20 Sheets-Sheet 11
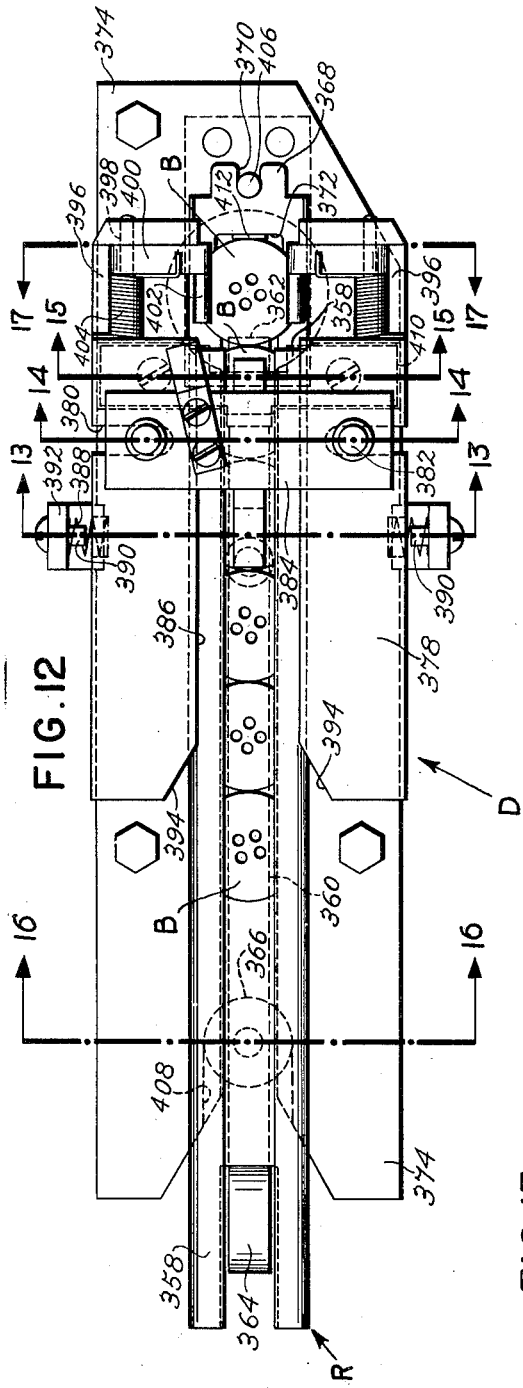
INVENTOR
ARTHUR G. MIREL
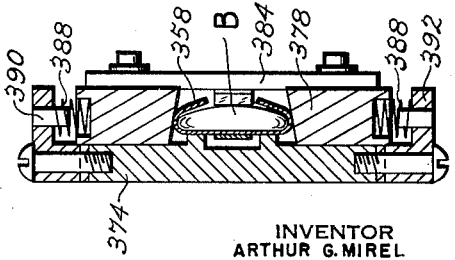
ATTORNEY

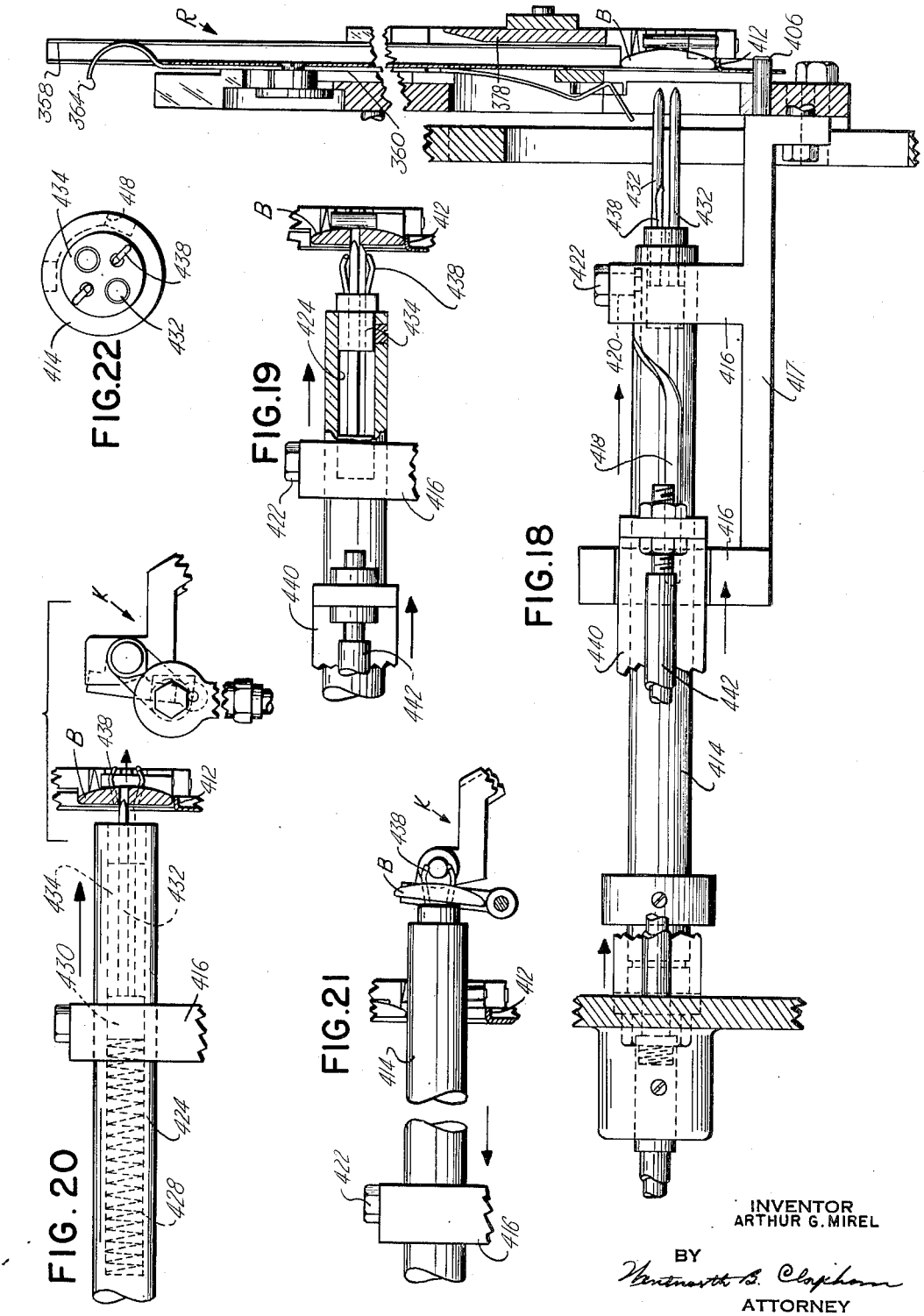

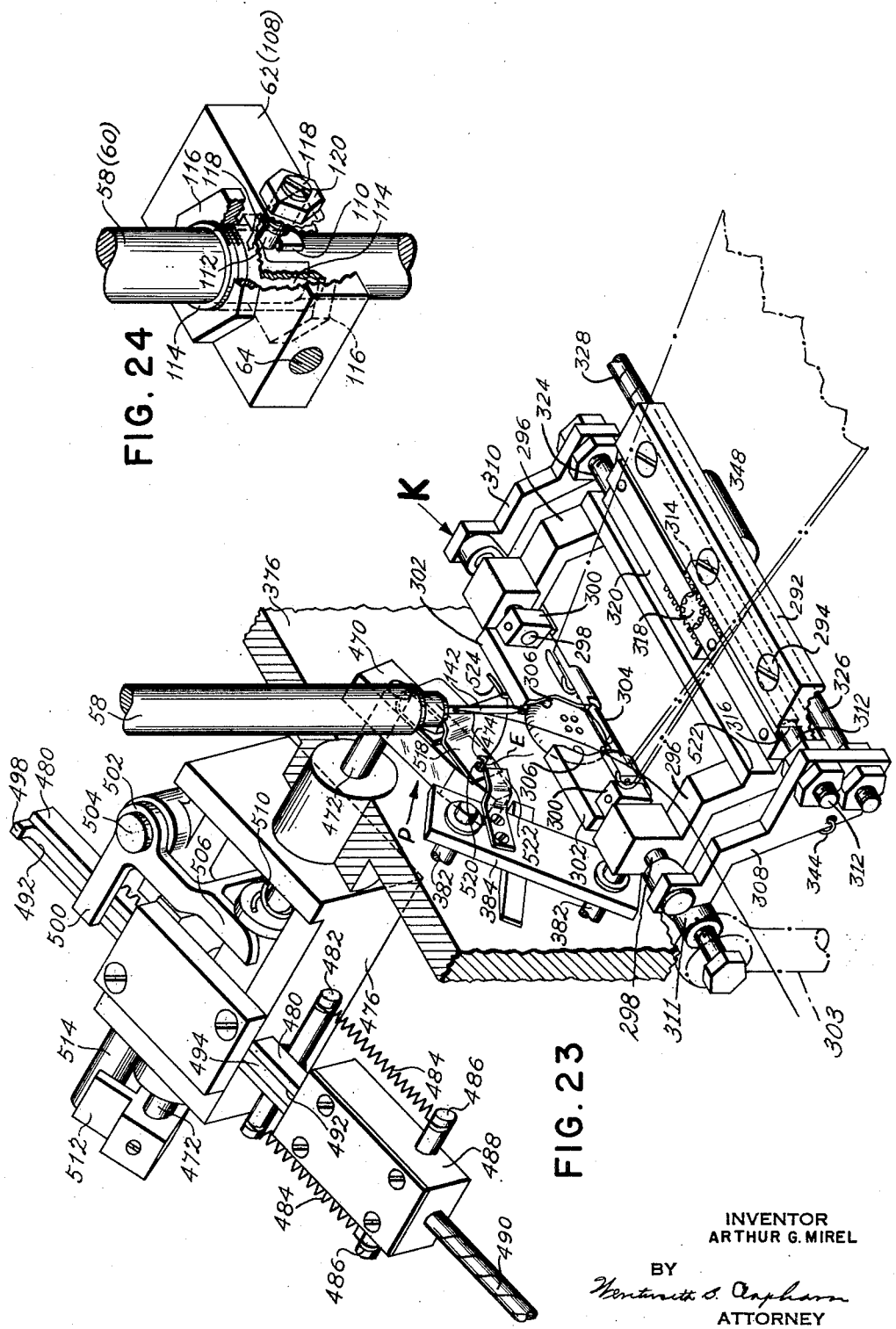

Nov. 5, 1957  A. G. MIREL  2,811,939
BUTTON SEWING MACHINE
Filed Jan. 13, 1954  20 Sheets-Sheet 14
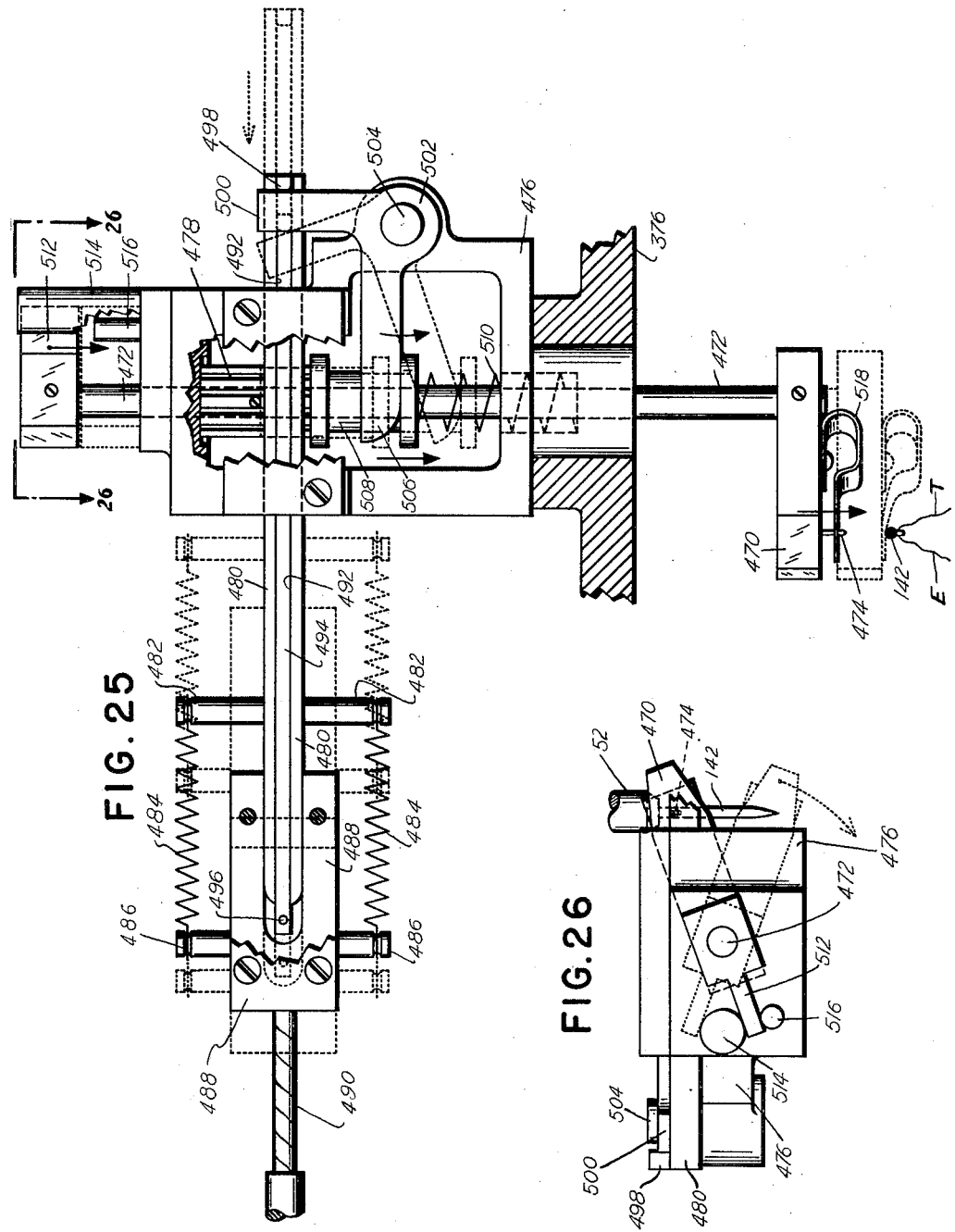
INVENTOR
ARTHUR G. MIREL
BY
ATTORNEY

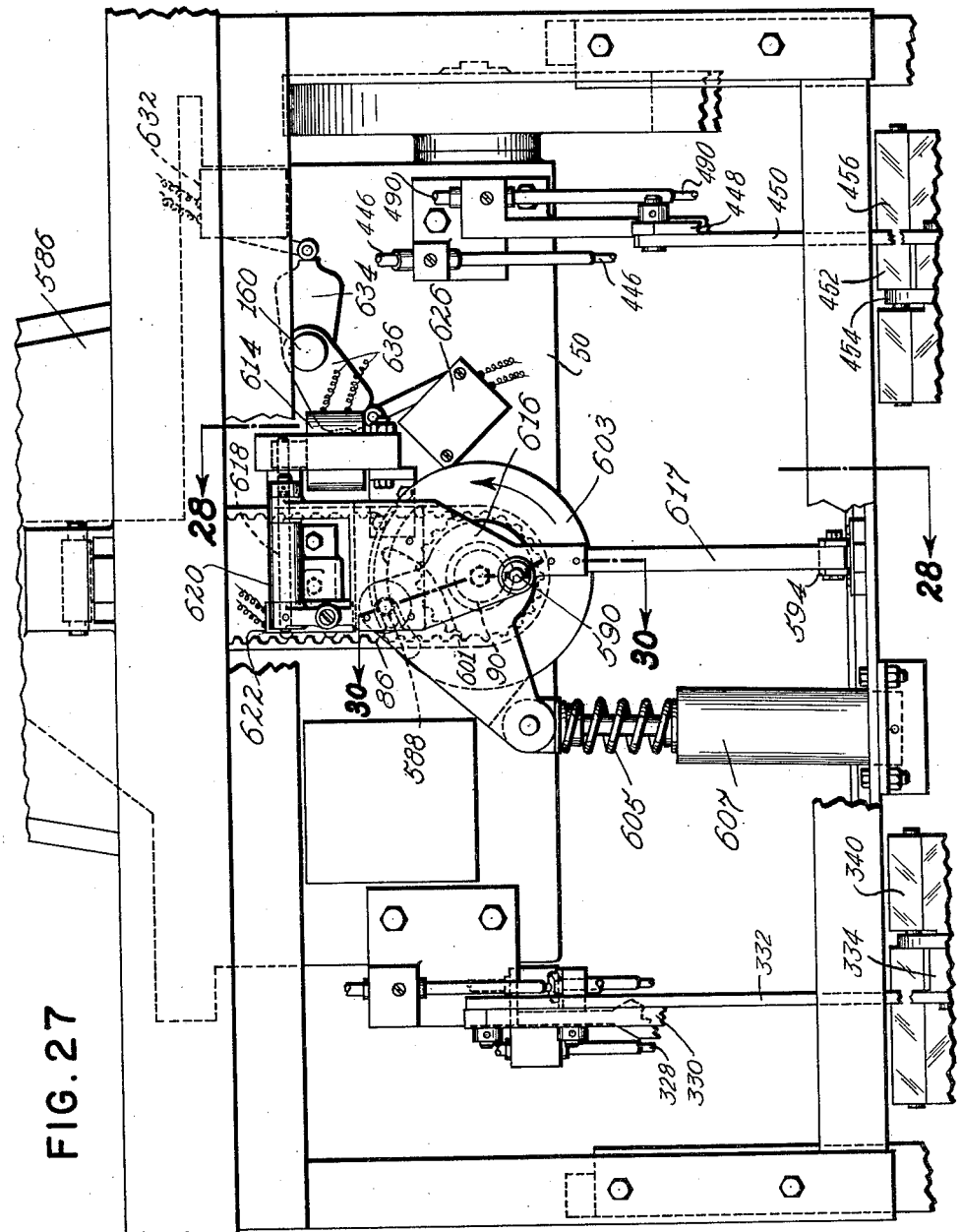

Nov. 5, 1957    A. G. MIREL    2,811,939
BUTTON SEWING MACHINE
Filed Jan. 13, 1954    20 Sheets-Sheet 16
FIG. 28
FIG. 29
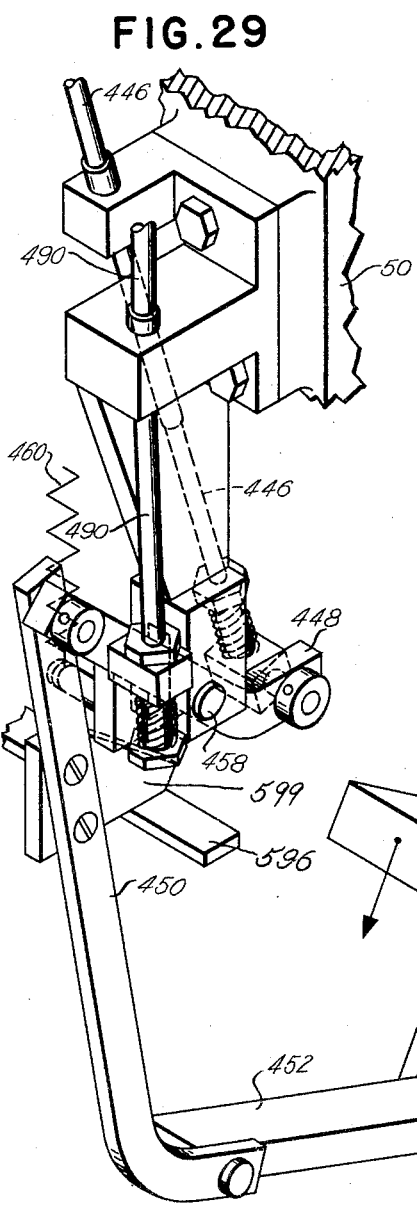
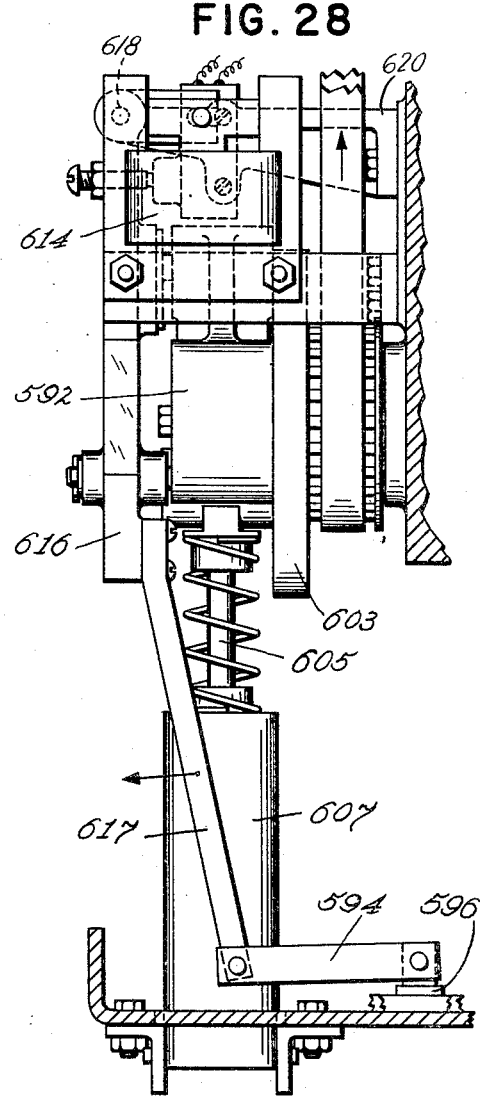
INVENTOR
ARTHUR G. MIREL
BY
ATTORNEY Nov. 5, 1957 A. G. MIREL 2,811,939
BUTTON SEWING MACHINE
Filed Jan. 13, 1954 20 Sheets-Sheet 17
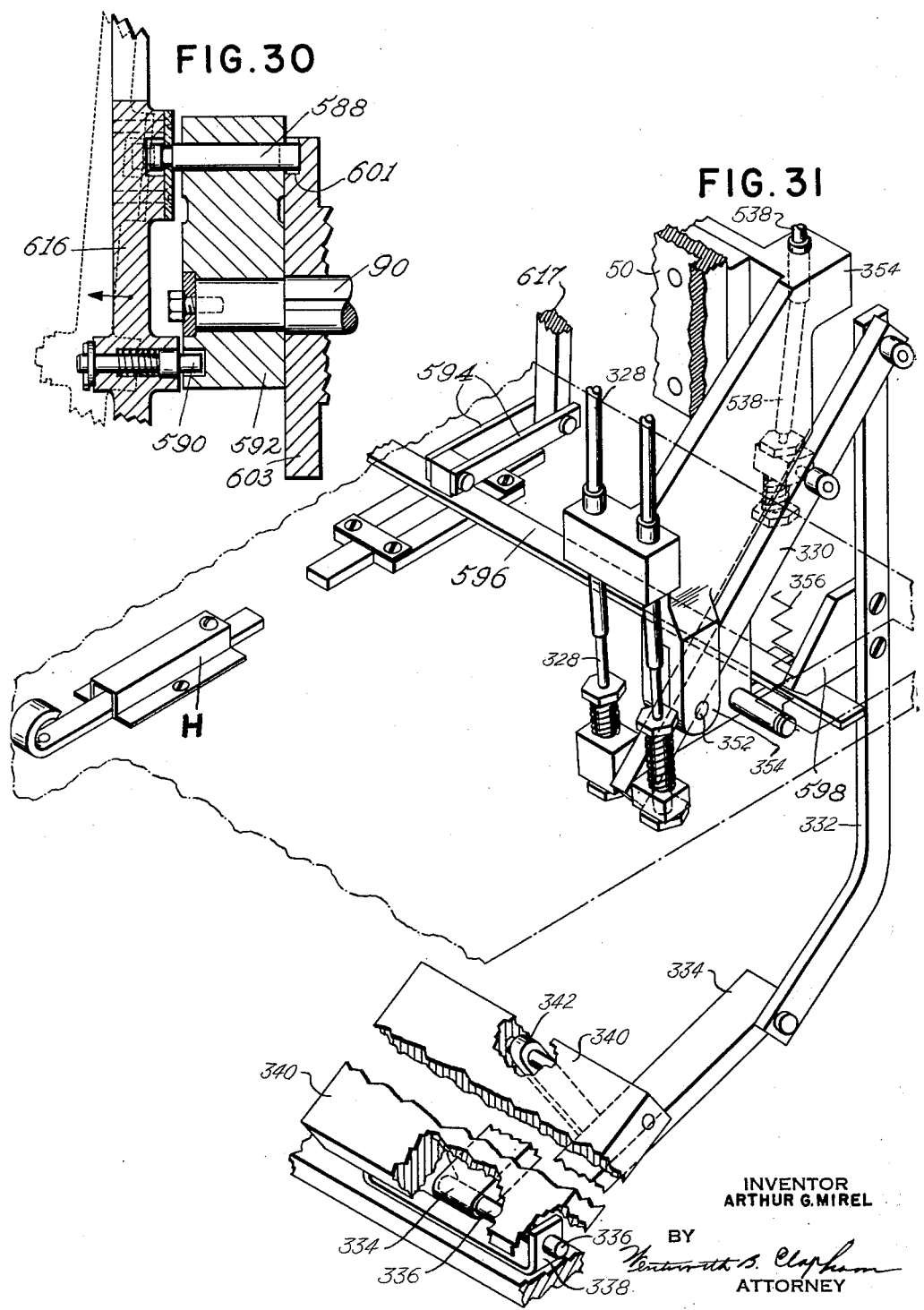
INVENTOR
ARTHUR G. MIREL
BY
ATTORNEY Nov. 5, 1957 — A. G. MIREL — 2,811,939
BUTTON SEWING MACHINE
Filed Jan. 13, 1954 — 20 Sheets-Sheet 18
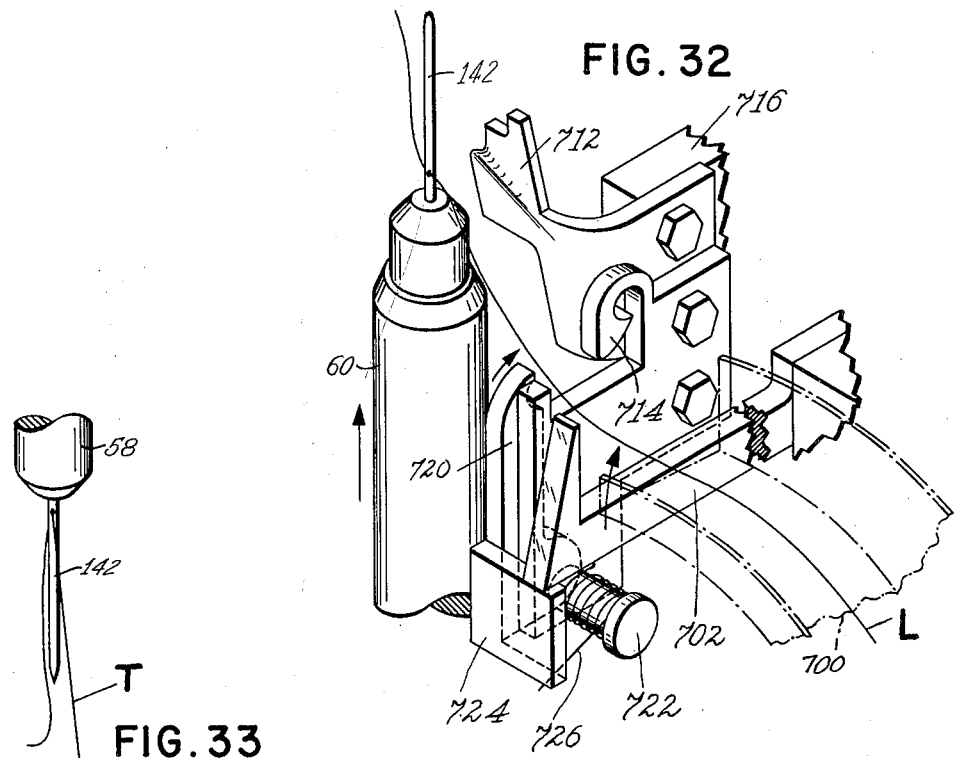
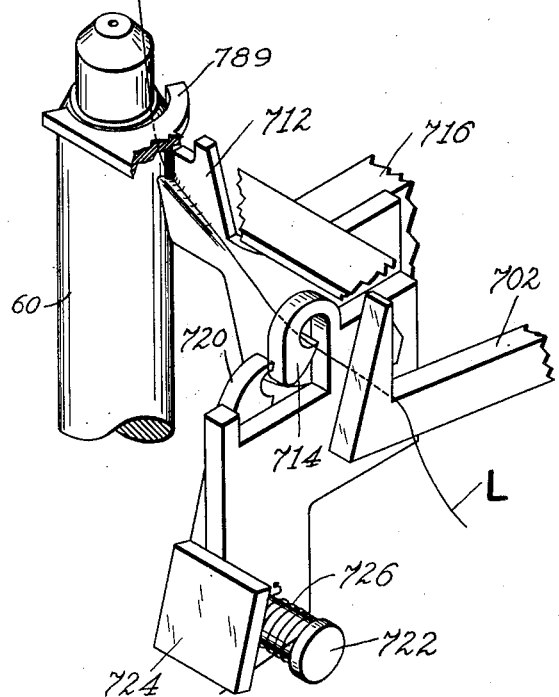
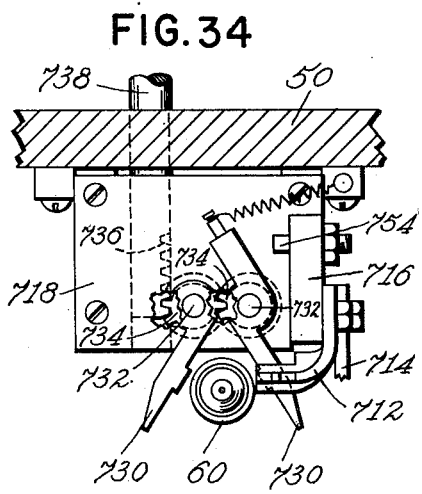
INVENTOR
ARTHUR G. MIREL
BY
Wentworth B. Clapham
ATTORNEY INVENTOR
ARTHUR G. MIREL
BY
Wentworth B. Clapham
ATTORNEY Nov. 5, 1957 A. G. MIREL 2,811,939
BUTTON SEWING MACHINE
Filed Jan. 13, 1954 20 Sheets-Sheet 20

INVENTOR
ARTHUR G. MIREL
BY
ATTORNEY 2,811,939
BUTTON SEWING MACHINE

Arthur G. Mirel, Bayside, N. Y., assignor to American Machine & Foundry Company, a corporation of New Jersey Application January 13, 1954, Serial No. 403,678

40 Claims. (Cl. 112—108)

This invention relates to sewing machines and more particularly to improvements in sewing machines adapted to sew buttons and like fastening devices to materials, such as articles of clothing and the like. The machine constituting the invention is so designed that buttons attached to the work are provided with a thread "post" or "shank" whereby the button is supported away from the work, and appears to be actually hand sewn thereto.

According to the present invention, buttons are sewn to the work with a single relatively short length of thread passing through the eye of the needle which is moved back and forth by alternately operating needle bars through the material and selected button holes in such manner that the thread travels in closed continuous paths. In this manner one or more, or any desired number of complete loops of thread, are made to bind the button to the work. The attaching of a button to the work also includes wrapping or winding a portion of the same thread about the loops of thread which attach the button to the work and then securing the windings against unwrapping. In this way, each button is so attached to the work that it is supported above the work, and the thread securing the button to the work cannot become loosened because of the manner in which the windings or wrappings are secured against unwinding.

The invention consists in improvements to button sewing machines of the type disclosed in Johnson et al. Patent 2,451,495 and in copending Patterson and McGinley application, Serial Number 217,645, one of its important features being that it makes possible simulated "hand" sewing wherein no thread or a minimum of thread, such for example as a single stitch, appears on the under surface of the work or material to which the button is secured. By novel means described hereinafter, it is now possible to insure that this result will be obtained regardless of the thickness of the work to which the button is being secured.

The desirable results of the invention are accomplished by folding the work, such as an article of clothing, and locating the folded edge in the path of travel of the needle so that the thread is passed back and forth first through the work and within the thickness thereof and then exteriorly of the work in order to form each attaching loop of thread. By providing mechanism for adjusting the position of the work relative to the needle, variations of thicknesses of materials can be compensated for and the desired "blind" stitching is secured.

During the first of the sewing operations, or the actual securing of a button to the work by a succession of closed loops of a single continuous thread, the button is located in a plane at substantially right angles to the path of travel of the needle, and the button and folded edge of the work which are supported by a table, are moved thereby alternately laterally and longitudinally at proper times during the sewing operations or through a predetermined sewing pattern path in order that the thread may be passed back and forth through selected holes in the button.

When the button has been secured to the work by a plurality of loops of thread as mentioned above, the button is swung through 90°, such that the plane thereof lies in a plane parallel to the path of travel of the needle and the work is substantially at right angles relative to the path of movement of the needle in order to locate or position the loops of thread connecting the button to the work in the path of travel of the needle. The second phase of the attaching operations, or the "post" winding operations, is then effected. In this operation, the button and work are moved back and forth out of the path of the needle so that on one stroke, the needle passes in one direction of movement on one side of the loops and on its next stroke, it passes on the other side of the loops in the opposite direction. This operation winds or wraps thread about the loops connecting the button to the work for forming what is known in the trade as a "post" or "shank". After a suitable number of post forming wraps or windings of thread has been made, the thread is located or anchored against unwrapping. In accordance with the invention, this is preferably done by moving the needle through the loops and windings forming the shank. The locking of the thread against unwinding or unwrapping completes the sewing operation.

An important feature of the invention is the provision of means operative during the posting operation to prevent the thread from unwinding in a direction opposite to that in which it is being wrapped about the loops of thread attaching the button to the work. Unless this is done, there is danger that the proper sewing operations cannot proceed because of the lack of a loop which can be engaged by a thread puller and properly disposed upon a thread receiving drum. In order to insure a positive loop of thread, a finger has been provided to bear against the windings of thread when one needle bar moves downwardly after the transit of the needle in partially forming a post wrapping about the loops of thread attaching the button to the work. The finger provides a reaction point and prevents the unwinding of thread wrappings because it holds the thread firmly and insures that there will be a loop of thread to be engaged on each operation of the thread puller.

In the attaching of buttons to articles of clothing, it is highly desirable that each button be attached in a minimum of time. The machine embodying the invention solves this problem because it allows an operator to perform several steps when the machine is inoperative so that the cycle of machine operations necessary for sewing, "post" wrapping and locking the thread is effected with great rapidity. These results are obtained by the use of manually operated members which control selectively operated portions of the machine. One manual control in the present machine may be operated by the operator's right foot. The other manual control may be operated by the left foot. There are several mechanisms forming operative parts of the machine which are connected to each control member and are so integrated that as a result of pressing first the right control member and then the left control member, all of the several mechanisms of the machine which are actuated or controlled thereby, sequentially perform their prescribed functions and ready the machine for actual automatic operation.

For example, in readying the machine for sewing operations, the right control member is first operated. This effects delivery of a button into position to be gripped by the button chucks which as the result of depressing the left manual control member are now open. In operation, the right pedal is depressed, and thereby opening the button chuck and lifting the presser foot off the work and moves the work holder for loading. This control member is held in this position while the left control member is depressed and by this action, a button is oriented and delivered to the button chuck. At this point, the right control member may be returned to its normal position and a further actuation of the left control member will perform the automatic threading and anchoring operation of one end of the thread. When the left control member is released and the loaded work holder has been positioned in operative position, the preparation of the machine for actual automatic sewing and posting operations is completed.

Another problem which the invention overcomes is that of providing means for insuring that the work will always be properly positioned for attaching buttons thereto or desired locations thereon. The mechanism provided by the invention makes it possible to accomplish this result with greatly improved care and efficiency. This is due to the fact the work holder which supports the work can be moved into the open so that the work can be placed thereon and secured against movement within full vision of the operator. This mechanism includes means for not only securing the work on the holder when loading but also for securing the loaded work holder against movement for the actual sewing operations.

It is an object of the invention to provide an improved button sewing machine for attaching buttons or like fastening devices to materials, such as articles of clothing and wearing apparel, and especially to button sewing machines adapted to attach buttons and the like to articles of clothing and wearing apparel in a manner closely simulating hand sewing.

It is further object of the invention to provide a sewing machine for attaching buttons and similar fastening devices to materials such as articles of clothing and wearing apparel in which means are provided for preventing an undesirable crease or drawing together or pucker in and around the portion of the work through which the thread is passed back and forth in securing a button thereto. This has been found to be especially valuable in attaching buttons to the new types of synthetic materials and "hard" fabrics, such as "hard" gabardines.

The invention is further characterized by the provision of a novel button delivering and positioning system in order to insure that each button being sewn to the work will be positioned with great accuracy in button sewing position without the necessity of operating the machine to first orient a button before it is moved into position to be attached to the work. This result is effected by locating the button in position to be delivered to button sewing position when the machine is not operating, and as a result thereof, much sewing time is saved.

It is a further object of the invention to provide a novel means for effecting the delivery of buttons into position to be transferred into the button chucks so that buttons may be delivered thereby into button attaching position relative to the work. For this purpose clips or elongated frames capable of holding several buttons are provided. These coact with means adapted to hold the clips loaded with a desirable number of pins for delivery of the latter to the button delivery and positioning mechanism.

The invention also contemplates the provision of a novel work holding mechanism provided with means for retaining the work securely during the attachment of a button thereto, and especially during the motion of the work holder as it travels in a closed path of movement laterally and longitudinally relative to the path of travel of the needle through selected button holes in accordance with the prescribed movement of the work holder.

It is a further object of the invention to provide means associated with the work holder for eliminating pucker of the cloth or fabric as the result of sewing a button thereto.

The invention also consists in improved mechanism for driving the opposed needle bars in proper timed relation without any fly wheel effect, thereby allowing for quicker starting and stopping of the machine in absolute position, and permitting a higher rate of production.

The invention also consists in the provision of a novel button chuck capable of accommodating a substantial range of buttons automatically, thus making the machine effective and efficient in handling many types and sizes of buttons without necessitating the resort to the use of model parts which would require a substantial loss of time in adapting the machine for sewing different types and sizes of buttons.

The invention also consists in the provision of novel mechanism for controlling the height of "post" and for adjusting the depth of sewing and for also controlling the post tension or tensioning of the threads wrapped about the loops of thread attaching a button to the work.

The invention also consists in the provision of a separate cam for operating each of the needle bars in order that despite sudden deceleration in stopping the machine at the end of a sewing and post wrapping cycle of operations, the machine will stop at zero position in a minimum of time.

The invention also includes novel mechanism coacting with the operating means of the machine for insuring that at the end of each cycle of operations, the machine will stop at zero position. In this manner problems of servicing and maintenance are reduced to a minimum over the life of the machine.

It is also an object of the invention to provide automatically operated means for use in threading the needle and also anchoring one end of the thread preparatory to sewing on a button.

The invention also includes novel mechanism for performing preliminary operation prior to the actual sewing and "post" forming operation of the machine.

A further object of the invention is the provision of a novel work holder, and mounting means therefor which makes it possible for an operator to have full control in placing and securing the work on the work holder, and also to insure that the loaded work holder will be positioned properly for actual sewing operation.

The invention also consists in the provision of interlocks and control means for insuring the proper operation of the machine such that an operator may operate the machine with the knowledge that there is little or no danger of injury from operating it, that buttons will be properly attached, and that there is substantially no danger of machine breakage. Hence the general efficiency is improved.

With these and other objects not specifically mentioned in view, the invention consists in certain combinations and constructions which will be described fully hereinafter, and then set forth in the claims hereunto appended.

In the accompanying drawings, which form a part of this specification, and in which like characters of reference indicate the same or like parts:

Figs. 1, 1A and 1B, when joined on lines A—A and B—B, illustrate a sectional front elevation of the button sewing machine;

Fig. 1C is a partial front elevation of the hood of the machine illustrating the starting lever and its emergency lock mechanism;

Figs. 2 and 2A, when joined on line C—C, illustrate a sectional side elevation of the button sewing machine;

Figs. 3 and 3-A, when joined on line D—D, illustrate a sectional plan view of the same.

Fig. 4 is a plan view partly in section of the work holder mechanism;

Fig. 5 is an enlarged detailed plan view of the work holder clamping device in conjunction with the anti-pucker pin;

Fig. 6 is a sectional side elevation of the same taken on line 6—6 of Fig. 5;

Fig. 7 is a sectional side elevation of the work holder and its supporting and operating mechanism;

Fig. 8 is a sectional end elevation of the same taken on line 8—8 of Fig. 7;

Fig. 9 is a sectional end elevation taken on line 9—9 of Fig. 7 illustrating the button chuck supporting and operating mechanism.

Fig. 10 is a sectional end elevation taken on line 10—10 of Fig. 7 of the work supporting table and the post height adjusting mechanism;

Fig. 11 is a sectional end elevation taken on line 11—11 of Fig. 7 illustrating the work support locking mechanism;

Fig. 12 is a top plan view of the button feeding and positioning mechanism;

Fig. 13 is a sectional end elevation taken on line 13—13 of Fig. 12.

Fig. 14 is a sectional end elevation taken on line 14—14 of Fig. 12.

Fig. 15 is a sectional end elevation taken on line 15—15 of Fig. 12.

Fig. 16 is a sectional end elevation taken on line 16—16 of Fig. 12.

Fig. 17 is a sectional end elevation taken on line 17—17 of Fig. 12;

Fig. 18 is a plan view illustrating the button ejector mechanism in conjunction with the button clip and receiving mechanism;

Figs. 19, 20 and 21 are side elevations of the button ejector mechanism illustrating the successive steps in transferring the button from the button receiving station to the button chuck;

Fig. 22 is a front elevation of the button ejector mechanism during the engagement with a button during transfer;

Fig. 23 is a perspective view illustrating the automatic needle threader in conjunction with the button chuck mechanism;

Fig. 24 is a perspective view partially in section, illustrating the needle bar supporting and release mechanism;

Fig. 25 is a plan view of the automatic needle threader;

Fig. 26 is a rear view of the same as seen from line 26—26 of Fig. 25;

Fig. 27 is a partial rear view of the machine illustrating the indexing and stopping mechanism;

Fig. 28 is a side elevation of the indexing and stopping mechanism taken on line 28—28 of Fig. 27;

Fig. 29 is an isometric view illustrating the left foot treadle control mechanism of the machine;

Fig. 30 is a sectional side elevation illustrating the construction of the locking mechanism in detail;

Fig. 31 is an isometric view showing the right foot treadle control mechanism of the machine;

Figs. 32 and 33 are isometric views illustrating the successive positions of the thread control mechanism during sewing as well as posting operations;

Fig. 34 is a plan view of the loop control mechanism; and

Figure 1:
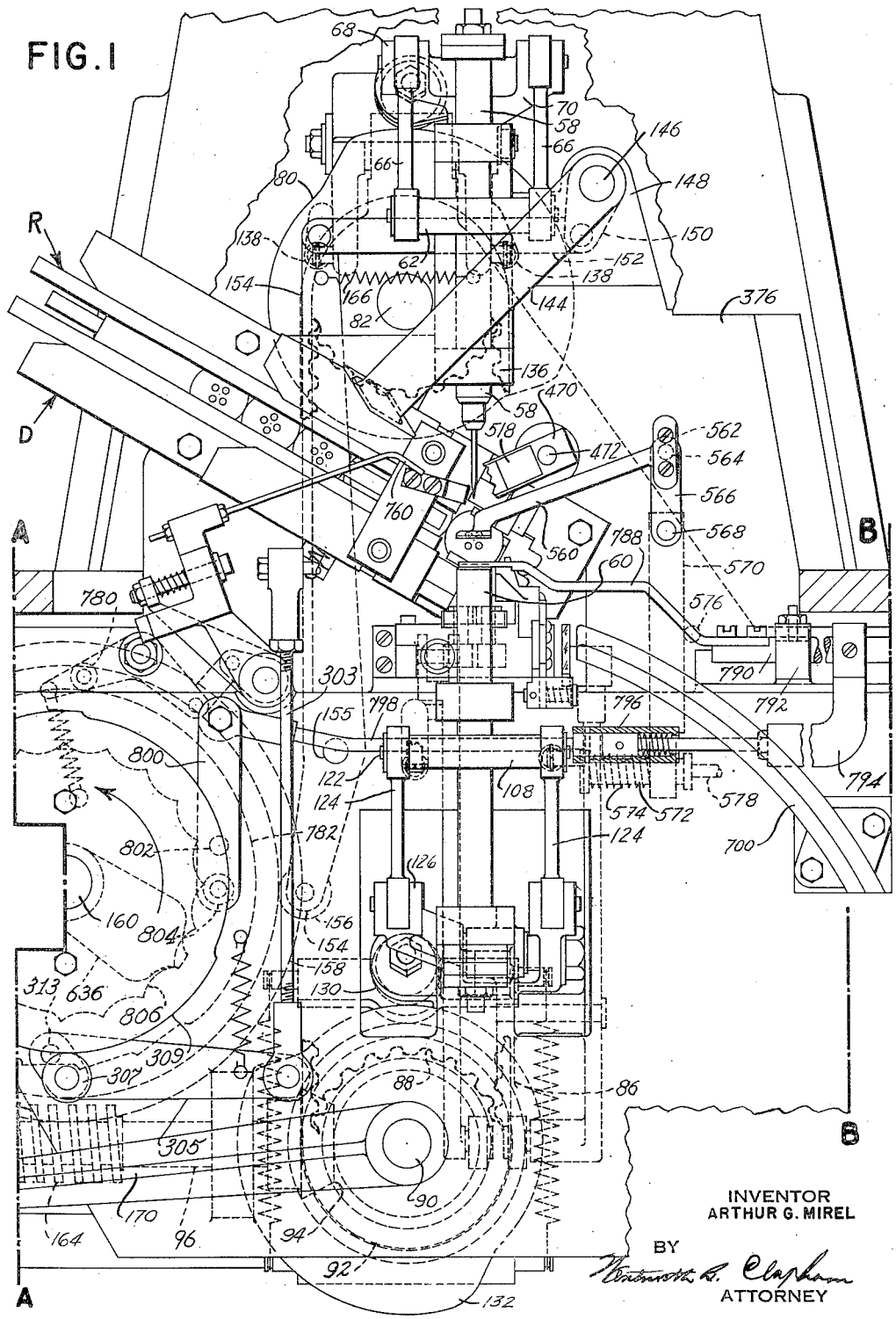

Referring to the drawings which show a preferred embodiment of the invention selected for purposes of illustration, the driving and operating mechanisms of the machine are suitably supported in a central base or main frame 50. In the machine illustrated, main frame 50 is detachably secured in a cradle or bed frame 52 mounted on a suitable stand 54 provided with legs 56.

The machine is of the type disclosed in Johnson et al. Patent No. 2,451,495 and therefore is provided with an upper needle bar 58 and a lower needle bar 60, which bars are generally similar in construction and operation to those shown in the Johnson et al. patent.

Upper needle bar 58 is adjustably and detachably mounted in a block 62 (Fig. 24), pivotally supported on a pair of links 66 by means of studs 64. The lower needle bar 60 is also adjustably and detachably mounted in a block 108 similar in construction to block 62 which supports the upper needle bar 58.

Figure 2A:
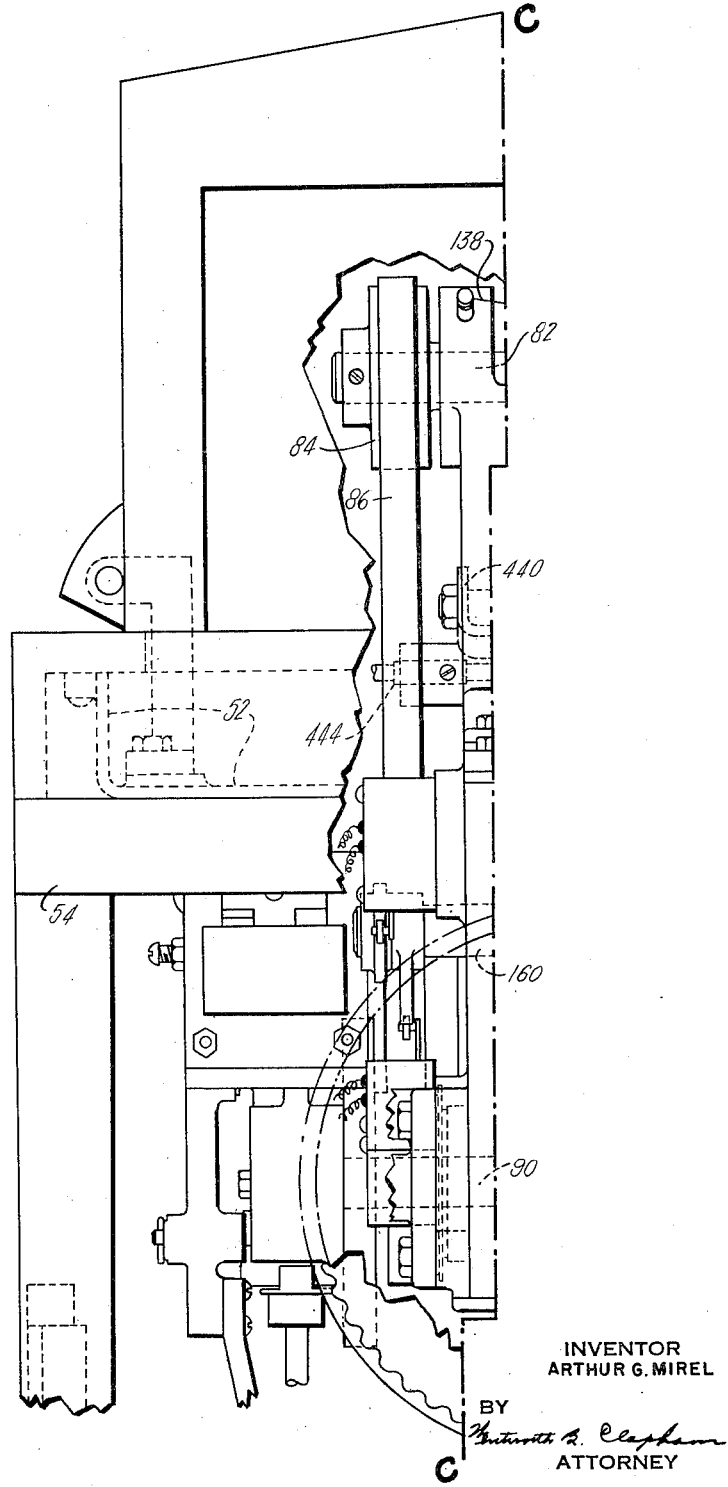

The upper ends of links 66 are pivotally connected to the forked end 68 of an actuating lever 70 (Fig. 2A), which is freely supported on a stud 72 held by a lug 74 on the central base or main frame 50. The free end of actuating lever 70 is provided with a stud 76 on which is rotatably mounted a cam follower 78 which engages and runs on a cam 80 mounted on a shaft 82 supported in suitable bearing lugs of the central base 50. Mounted on shaft 82 is a toothed pulley 84 which is driven by a suitable corrugated timing belt 86, of the type known as a Gilmer belt. Timing belt 86 also runs on a similar toothed pulley 88 mounted on a horizontal driving shaft 90 supported in suitable bearings in the lower portion of the main frame base 50.

Shaft 90 is driven by a bevel gear 92 attached thereto which meshes with bevel gear 94 mounted on shaft 96 supported in suitable bearings in the main frame base 50. Shaft 90 also carries a toothed pulley 98 which through a corrugated belt 100, which may also be a Gilmer belt, is driven by toothed pulley 102 fixed to shaft 104 of a suitable motor 106.

Each needle bar 58 and 60 is provided with a bayonet or L-shaped slot 110 (Fig. 24) which engages with a short flat headed stud 112 carried by and protruding through a hole in a sleeve 114 which fits slidingly over its respective needle bar. The ends of each sleeve 114 are provided with a threaded section on which is turned a lock nut 116 which locks sleeve 114 to its respective block 62 or 108. Sleeves 114, are supported in vertical bores in the needle supporting blocks.

Each needle block is also provided with a threaded hole through which extends a set screw 118 adapted to press against the flat head of stud 112 and lock it in the bayonet slot of the needle bar, thus securing the needle bar to its supporting block. A lock nut 120 is provided in order to prevent set screw 118 from disengagement with the flat head of lock stud 112.

Mechanism is provided for adjusting the position of each needle bar in its respective support. Since the adjusting mechanism is the same for each needle bar, only one is described in detail. Referring to Figure 24 set screw 118 is unscrewed to release the locking effect of stud 112 on needle bar 58, and lock nuts 116 are unscrewed to effect an up or down movement of sleeve 114 as desired. When the desired position of the needle bar is obtained, nuts 116 are tightened against block 62, and set screw 118 is tightened. Needle bar 58 can be removed quite readily from its block 62 by backing up set screw 118, and then turning bar 58 slightly to effect a dihengagement of its bayonet slot 110 from lock stud 112 after which the needle bar can easily be slid out of its block 62. Lower needle bar 60 is removed from its supporting block 108 in a similar manner.

The lower needle bar supporting block 108 is pivotally supported by a pair of horizontal opposed studs 122 in the upper ends of a pair of links 124. The lower ends of links 124 are pivotally connected to the forked end of an actuating arm 126 suitably swingably mounted on stud 128. The free end of arm 126 carries a cam follower 130 adapted to engage and run on cam 132 attached to shaft 90.

Guide abutments 134, 136 projecting outwardly from main frame 50, are provided with axially aligned guide bores (not shown) in which needle bars 58, 60 slide in their operative movement.

In order that cam follower 78 of upper needle bar actuating arm 70 and cam follower 130 of lower needle bar actuating arm 126 may remain constantly in contact with their respective cams, each actuating arm is provided with a pair of tension springs 138 and 140, respectively. A result of novel arrangement of the actuating mechanisms for the needle bar is that no breakage of parts can occur in case of breakage of the tension springs of the actuator arms.

In the machine disclosed herein, it is apparent that needle 142 is passed back and forth from the chuck of one needle bar to the other. The needle 142 preferably is pointed at one end and blunt on the other, or it may have a sharp point at each end.

The machine is provided with an upper looper arm, the general construction and operation of which are substantially the same as that of the looper arm disclosed in the above referred to Johnson et al. patent and copending Patterson et al. application Serial Number 217,645. Looper arm (Figs. 1 and 2) is mounted on a horizontal shaft 146 supported in suitable bearing lugs 148 forming a part of the main base 50. Also attached to shaft 146 is an arm 150 which is connected by link 152 to the upper free end of cam lever 154 loosely mounted on stud 155 fixed to the main base 50. The other end of cam lever 154 carries a cam follower 156 which engages and runs on a cam 158 mounted on cam shaft 160 supported in suitable bearings in the main base 50. Cam shaft 160 is driven by a worm wheel 162 mounted thereon and engaging with a worm 164 fixed to drive shaft 96. Cam follower 156 is maintained continuously in engagement with cam 158 by means of a suitable tension spring 166 attached to cam lever 156 and to the machine base 50. Cam 158, which operates looper arm 144, is so designed to actuate looper arm 144 only during the actual sewing operation, and maintains looper arm 144 in a stationary or dwell position during the "posting" operation.

The machine embodying the invention is provided with a thread puller 168 attached to the free end of an arm 170 mounted on one end of the horizontal shaft 90 which rotates at a constant speed during the operation of the machine.

Figure 3A:
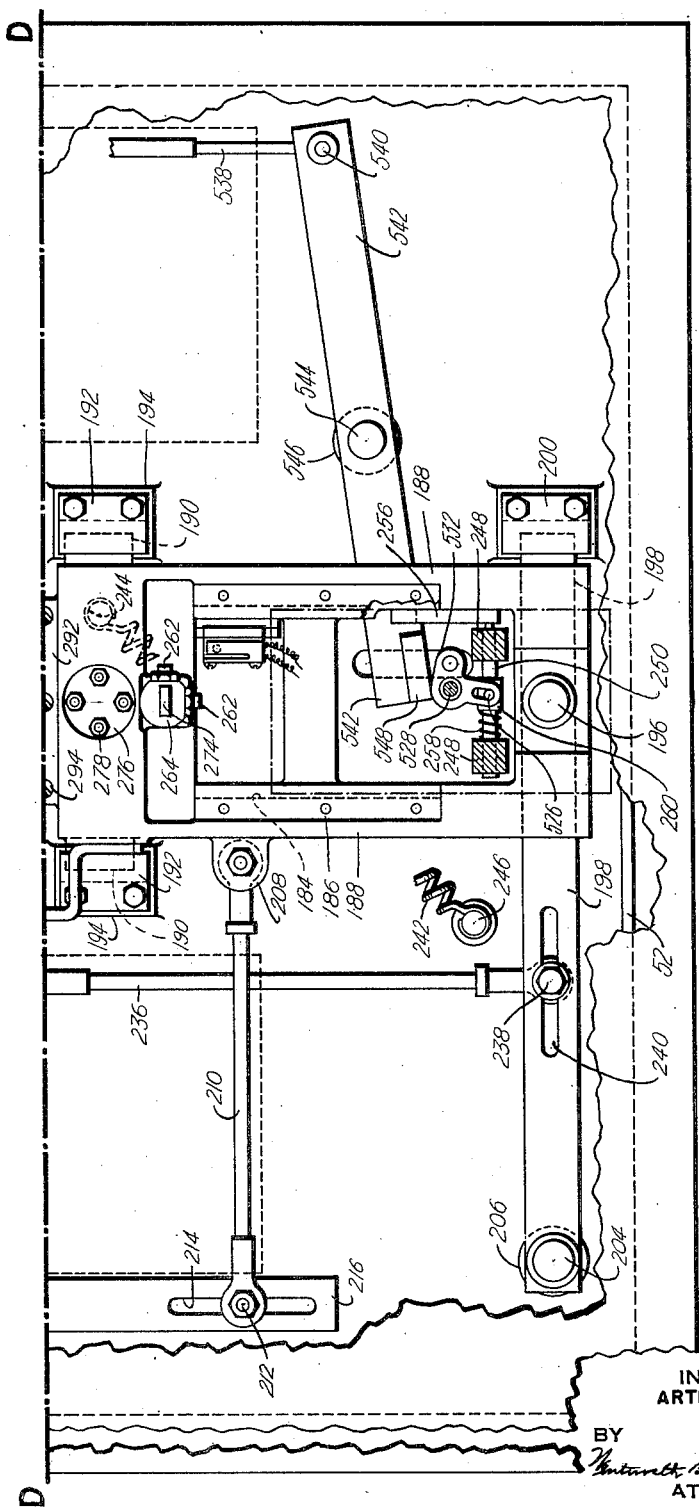

In the embodiment selected for purposes of illustrating the invention (see Figures 4, 7, 9, 10 and 11) the material or work M to which a button is to be sewed is folded over the free end of a work holder plate 172 which is then brought into engagement with a clamping plate or nest member 174 (Figs. 4, 7 and 10) having a pair of spaced curved prongs 176 extending in a fork-like manner from the free end of member 174. These prongs serve to hold the folded material firmly over the free end of the work holder plate 172 (see Figs. 5 and 6). The latter and the clamping plate 174 are pivotally or hingedly mounted on a horizontal hinge pin 178 held by suitable lugs 180 projecting from a work holder supporting member 182 slidably mounted in a pair of horizontal V-shaped grooves or tracks 184 of a pair of parallel rails 186 (Figs. 7 and 8) secured to a work table frame 188. At one end frame 188 is carried by a cross bar 190 having projecting ends which are slidably supported in a pair of guide tracks 192 (Figs. 3A and 10) secured to a pair of suitable bosses 194 of cradle 52. The other end of the work table frame 188 is pivotally secured by a stud 196 (Figs. 3A and 7) to a cross bar 198, one projecting end of which is slidably supported in a U-shaped guide track 200 mounted in a boss 202 of the cradle 52. The other projecting end of cross bar 198 is pivotally mounted on a vertical stud 204 in a suitable boss 206 of the cradle 52.

The work table frame 188 is also provided with a lug 208 (Figs. 3A and 8) to which is pivotally attached one end of a connecting rod 210. The other end of rod 210 is pivotally secured to stud 212 adjustably mounted in slot 214 in the free end of an arm 216 secured to a stud shaft 218 (Fig. 3) supported in a suitable bearing boss 219 of cradle 52. Also secured to stud shaft 218 is a cam lever 220 which at its free end carries a cam follower 222 which engages a cam 224 mounted on cam shaft 160. Cam 224 is employed to effect through the described cam lever 220 and the therewith connected linkage connected therewith a back and forth motion of work table frame 188. In order to properly and successively locate and align the button holes in the path of movement of needle 142 during button sewing operations, and to position the loops attaching a button to the work during "posting" operation, the table frame 188 in addition to its back and forth motion is also given a reciprocating or oscillating side motion so that in effect it describes a closed continuous path of movement somewhat similar to that obtained in the machine described in co-pending application S. N. 217,645.

The desired oscillating sideward motion is accomplished by means of cam 226 (Fig. 3) also mounted on cam shaft 160. Cam 226 engages cam follower 228 pivotally mounted on the free end of cam lever 230 secured to a vertical shaft 232 supported in bearing boss 219 of cradle 52. Also fixed to vertical shaft 232 is an arm 234, the free end of which is pivotally attached to one end of a link 236, the other end of which link is pivotally fastened to stud 238 adjustably secured in slot 240 of work table frame supporting bar 198 described heretofore. A suitable tension spring 242 having one end (Figs. 3A and 10) fixed to post 244 projecting from the under side of cross bar 190, and the other end anchored to a post 246 (Fig. 3A) projecting from the stationary cradle 52, maintains cam rollers 222 and 228 in constant contact with cams 224 and 226, respectively, and thereby assures proper movement of work table frame 188 in accordance with the profiles of cams 224 and 226.

The novel means for supporting work table frame 182 and the driving means associated therewith which secure the desired pattern of movement for smooth sewing and stitching operations is considered to constitute an important improvement in the art because of its simplicity of construction and smoothness of operation.

As mentioned heretofore, work holder supporting member 182, which pivotally supports work holder plate 172 and clamping plate 174, is slideably supported in work table frame 188. It is therefore desirable to secure member 182 to work table frame 188 so that it cannot move during button sewing and posting operations. Work holder supporting member 182 is provided with two lugs 248 which project from its underside and are provided with aligned bores 249 in which is slidably mounted a horizontal spring mounted lock pin 250 (Figs. 3A, 4, 7, and 11). When pin 250 is located in locked position and member 182 is held against movement, its conical end 252 engages with hole 254 in lock plate 256 secured to work table frame 188. A suitable tension spring 258 encircling lock pin 250 and confined between one of the supporting lugs 248 and collar 260 fixed to the central portion of pin 250 urges conical end 252 thereof into hole 254. The more the conical end of the pin enters the hole the more the work holder supporting member 182 and therewith the work holder plate is moved towards the needle 142 with which the button is to be sewed. This is because, as shown in Fig. 4 the rear face of conical end 252 bears against the rear edge of hole 254. Thus as the pin moves into the hole there is a camming action which secures the result mentioned.

In sewing buttons it is preferred to "blind" stitch them so that no thread, or a very minimum of thread will be visible on the underside of the work, or if the work has a lining, the needle will not pass therethrough. The invention constitutes a solution for these problems, by providing means which make it possible to control or vary the distance between the needle and the center of thickness of the work, or so position the work that any lining will not be in the path of movement of the needle, except for a first "tack" stitch, where this is desired.

The operative forward or sewing position of work supporting member 182 is controlled by one of a plurality of set screws 262 adapted to engage with the forward edge thereof. (See Figs. 3A, 4 and 7.)

The set screws 262 are mounted in a turret head 264 formed on or fixed to a vertical shaft 266 rotatably supported in a lug portion of work table frame 188. A collar 268 is secured to the lower end of shaft 266 (Fig. 7). A tension spring 270 encircling the portion of shaft 266 between the under side of work table frame 188 and collar 268 serves the purpose of maintaining notches on the underside of turret head 264 in engagement with suitable balls 272 supported in work table frame 188. In order to provide a quick and easy setting of the work holder 182 in relation to the needle in case of sewing buttons to different types and thicknesses of materials turret head 264 is provided with one or more pre-adjusted set screws 262. This arrangement allows a quick adjustment by merely a turn of ridge 274 of the turret head 264. The notches on the underside of turret head 264, as well as the balls 272 on the work table frame 188, are so positioned as to effect proper registration of each pre-adjusted set screw 264 so that the proper depth of sewing may be effected in accordance with each adjustment.

One of the features of the invention which contributes to the versatility of the machine is the provision of mechanism which enables the machine to be adapted easily and quickly to change or vary the "post" height. Thus a wide range of goods, articles of clothing or other material M may have buttons sewed thereto, and in each selected type of work the buttons attached thereto will have the proper "post" height or length.

In the mechanism selected to illustrate this part of the invention work table frame 188 is provided with a turret head 276 (Figs. 3A, 4, 7 and 10), which carries a plurality of vertically arranged set screws 278 each pre-adjusted to a different height. The construction and arrangement of the machine is such that clamp plate 174, which together with the work holder plate 172 holds the material beneath the button to be sewed, rests with a bumper 280 projecting from the underside of plate 174 on the top end of a selected set screw 278.

Since a button B to be sewed to the material M is held during posting operation by a suitable button chuck away from material M at a substantially constant level, a raising or lowering of the work holder elements, plates 172 and 174, results in a post having a height equal to the vertical distances between the underside of the button and the edge of the material M.

Turret head 276 is secured to a vertical shaft 282 on the lower end of which is mounted a collar 284. A tension spring 286 encircling the lower end of shaft 282 between the underside of work table frame 288 and collar 284 keeps notches 288 on the underside of head 276 in engagement with balls 290 which are suitably imbedded in the work table frame 188. This arrangement prevents unwanted turning of turret head 276. If a different post height is desired, the operator simply reaches under table frame 188, presses slightly upward on collar 284 and turns turret head 276 until the set screw, which gives the desired post height, engages with bumper 280 on the underside of clamp plate 174.

As mentioned heretofore, a button B to be sewed to material M, is held not only during sewing, but also during posting operation by a suitable button chuck which forms a part of the button chuck mechanism. Referring to Figures 3, 3A, 7, 9 and 23, it will be seen that this mechanism includes a bracket 292 secured to the head end of work table frame 188 by screws 294. Bracket 292 is provided with two spaced forward projecting arms or lugs 296. Each arm 296 carries a rotatably as well as slidably mounted shaft 298 on one end of which is mounted a block 300 (Figs. 9 and 23) which supports a jaw 302, preferably formed integrally therewith.

One of jaws 302 is provided with a lug which projects from its lower edge and carries a pin 304 (Fig. 23) adapted to engage and slide in a horizontal bore of a lug on the lower edge of the other jaw 302. This arrangement is provided in order to keep the two jaws properly aligned during their operation. The two inner ends 306 of jaws 302 which face each other are suitably grooved and shaped to be able to grip and hold a button. An arm 308 is secured to the free end of one of the jaw carrying shafts 298 (Fig. 2); and an arm 310 is attached to the free end of the other shaft 298.

A horizontal rod 312 having one end fastened to the other end of arm 308 is provided with a gear rack portion 314 which is slidably supported in a horizontal groove or track 316 formed in bracket 292. Rack 314 engages with a gear 318 rotatably confined in a circular cut-out or well in the bracket 292. Gear 318 also engages with another gear rack 320 which is also slidably supported in a U-shaped groove or track 322 parallel to track 316 and 314. The gear rack 320 forms a part of rod 324 which is secured to the other end of the arm 310 to which the other jaw carrying shaft 298 is attached. It will be seen that the jaws are so interconnected that they move simultaneously towards or away from each other although the movement is transmitted to one side of the jaw only. For this reason, the arm 308 is also attached to a rod 326 which in turn is connected to one end of a suitable flexible cable 328 such as a "TRU-LAY" cable manufactured by the American Chain and Cable Co. The other end of flexible cable 328 is suitably connected to arm 330 (Fig. 31) connected by a link 332 to lever 334 pivotally mounted on shaft 336 supported in a suitable bracket on the machine frame. Loosely mounted on shaft 336 is a foot treadle or pedal 340 connected by a link 342 to lever 334. By means of the mechanism described when treadle 340 is depressed, cable 328 is given a pushing motion which through rod 326 transmits the same to arm 308 and causes an opening of jaws 302 in order to allow a button to be placed therebetween. A tension spring 344 having its ends hooked to arms 308 and 310 respectively, effects a closing of jaws 306 when downward pressure on treadle 340 is released. The free end of rod 326 to which cable 328 is attached is supported in a suitable sleeve bearing 346 held by a lug 348 formed on and projecting from the underside of bracket 292 (Figure 9). Gear rack 314 and 320, and gear 318 are operatively supported and held in their respective tracks and well by a retainer plate 350. This plate is shown in Figures 3, 7 and 9 but is omitted from Figure 23 for clarity. Arm 330 is pivotally mounted on a stud 352 held in a bracket 354 secured to main base 50. Flexible cable 328 may be guided and supported by other suitable sleeve bearings attached at convenient places on the frame of the machine, such, for example, as shown in Figure 31. A tension spring 356 having one end hooked to arm 330 and the other end anchored to the machine frame structure, assists in maintaining treadle 340 in its normal uppermost position.

Buttons B to be sewed to an article of apparel or other selected material are forwarded to the machine operator in novel button containers or clips. This is an important feature of the invention since it makes it possible to insure that the proper color, size and type of button will be available for attachment to a particular piece of goods or work. When the machine is used for sewing buttons to men's coats, for example, a clip containing the correct buttons is placed in one of its pockets. Thus there is no guess work required on the part of the operator as to the type, color or size of button for the suit coat or garment. Since all buttons on a garment may not be of the same size, but may be different in diameter, clips of different width may be used, and the machine is so constructed in accordance with the invention, or to accommodate clips of various widths and to sew buttons of different diameters without difficulty or adjustment. The number of holes in a button, and their arrangement regardless the size of button are substantially the same. That is, in four hole buttons, the spacing of the holes and the size of holes are substantially the same regardless of difference in diameter.

The button clips R, as illustrated in Figures 12-18 consist of a suitably shaped elongated slotted channel member 358 of a length sufficient to hold a plurality of buttons arranged in side by side engagement.

A long flat spring 360 is suitably secured to the bottom side of channel member 358. The free ends 362 and 364 of spring 360 are suitably shaped and protrude through slots in the ends of channel 358, and prevent buttons loaded in a clip R from dropping or falling out while clips are being forwarded to or handled by an operator. On the bottom side of channel 358 and close to the rear or loading portion thereof is secured a T-shaped knob 366.

The front or button delivery end of channel member 358 is provided with a pair of prongs 368 forming a slot or track 370 (Fig. 12). The front bottom portion of channel member 358 is also provided with a cut out portion 372, and the top flanges of channel member 358 which retain buttons in the clip, are also cut away at this point.

When preparing for sewing buttons on the machine, the operator inserts a loaded clip R with its front or delivery end into a clip receiving and supporting device designated generally D, so that buttons can be delivered from the clip into jaws 302.

The clip receiving device D consists of an angularly mounted upright plate 374 attached to a vertical member 376 of main base 50. A pair of spaced side clamping bars 378 is slidably and yieldably secured to the front face of plate 374. Each bar 378 is provided with a slot 380 adapted to engage a headed stud or pin 382. Clip clamping bars 378 are slidably retained on the face of plate 374 by means of a plate or cross bar 384 held by studs 382 (Figs. 12, 13 and 14). The inner edges of clip clamp bars 378 which face each other are formed with a tapered surface 386 which bears against the sides of clip channel member 358. In order to assure firm, yet resilient gripping action by clamp bars 378 on channel member 358, the outer edge of each bar is pressed inwardly by a tension spring 388 (Figs. 12 and 13). One end of each spring 388 is secured to the outer edge of its respective clamp bar 378. The other end of each spring encircles a retainer pin 390 mounted in an arm of an L-shaped lug 392 attached to plate 374 (Fig. 13).

Easy insertion of a loaded clip R into device D is insured by the provision of a bevel 394 on the leading end of each clamp bar 378. The other or forward end of each clamp bar 378 is provided with a U-shaped, transverse cut out 396 bridged by a stud shaft 398 loosely supporting an arm or finger 400 from the free end of which extends a pin 402. These pins are substantially parallel with the inner edges of their respective clamp plates 378. The pins 402 are used for the purpose of retaining the foremost button in clip R, when this button reaches the forwardmost end of channel member 358 where the top flanges are cut away as described hereinabove. A tension spring 404 encircling each stud shaft 398 has a portion which presses against each finger 400 in order to maintain fingers 400 and pins 402 in normal button retaining position and to allow them to yield when a button is ejected from clip R.

When a loaded button clip R is inserted in device D it is pushed forwardly between clamp plates 378 until prongs 368 engage pin 406 whereupon the clip R is properly seated.

T-shaped knob 366 which projects from the base of clip R in the meantime has entered and engaged in a track 408 in plate 374 so that clip R is firmly held and properly positioned for operation of the machine by the operator.

As mentioned hereinabove, bent ends 362 and 364 of spring 360 prevent buttons from rolling or dropping out of clip R. However, during the insertion of a loaded clip R into receiving device D, end 362 of spring 360 engages a cross bar 410 (Figs. 12, 15 and 18) which causes end 362 to be deflected away from and to be held out of engagement with the foremost button in clip R. Thus due to the inclined position of the channel member 358 buttons now can gravitate downwardly in channel member 358 until the leading button is arrested by a lip 412 (Figs. 12 and 18) projecting from cut out 372 at the front or button delivery portion of channel member 358. This leading button now is positioned and is ready for ejection from button clip R into jaws 302 of the button chuck.

The preferred form of button ejecting mechanism selected for purposes of illustration is shown in Figures 2, 2A, and 18 to 22 inclusive. In the machine described herein this mechanism consists of a horizontal shaft 414 having a hollow portion 424. Shaft 414 is slidably and rotatably mounted in suitable bearing lugs 416 of bracket 417 attached to plate 376 (Fig. 18). Shaft 414 is provided with a suitable elongated cam track 418 engaged by the end of a screw 422 mounted in one of the lugs 416. Hollow portion 424 on the forward part of shaft 414 carries a coil spring 428 having one end bearing against a piston-like member 430 slidably confined in the hollow cylindrical portion 424. The other end of spring 428 presses against the bottom wall of hollow portion 424. Attached to piston-like member 430 are two long spaced pins 432 which extend from member 430 outwardly through guide bores in a plug 434 secured by set screw 436 in the forward end of shaft 414.

Also mounted on plug 434, projecting outwardly therefrom and generally parallel with pins 432 are two spaced spring steel rod prongs 438. These prongs are so located in relation to pins 432 that they line up with one opposed pair or diagonally opposite holes in a button; the pins 432 line up with the other pair of opposed button holes. See Figure 22. The rear end of shaft 414 is attached to the end of a bracket 440 the other end of which is secured to one end of a pusher rod 442 slidably supported and guided by a bearing sleeve 444 (Figs. 2, 2A and 18) held by a lug on main base 50. Attached to the other end of pusher rod 442 is one end of a flexible cable 446, which may be of the "TRU-LAY" type mentioned above. The other end of cable 446 is suitably attached to one end of lever 448 (Fig. 29), the other end of which is connected to one end of a link 450 secured to lever 452 to which is connected a link 454 pivotally secured to treadle or foot pedal 456. As described herein treadle 456 may be designated the "left" treadle control of the machine. Lever 448 is pivotally mounted on a stud 458 supported in a suitable manner in a portion of main base 50. The specific means (not shown) for mounting lever 452, and also treadle 456 may be the same as that shown in Fig. 31 for the support of the "right" foot treadle 340. A tension spring 460 hooked to link 450 and anchored to a suitable stud on the main base 50 is employed to keep treadle 456 in its normal upper position.

It is evident that the depression of foot treadle 456 results in a forward motion of shaft 414, which due to the turned down end 420 of screw 420 engaging cam track 418 causes shaft 414 to rotate whereupon the points of pins 432 are able to contact the face of the button B positioned in lower end of the button clip, as described heretofore, preparatory to moving through the opposed holes in the button. Although pins 432 may contact the face of a button, their resilient support provided by spring 428 allows shaft 414 to advance further and also transmits sufficient resilient pressure to pins 432 so that their points readily "find" and enter one pair of opposed holes (Fig. 19).

Since shaft 414 continues to advance, as well as revolve, a button B engaged by pins 432 is also rotated until the turned down end 420 of screw 422 contacts that part of track 418 in shaft 414 which is parallel with its axis. At this point the rotation of shaft 414 stops. However, shaft 414 continues to advance in a straight line and steel wire prongs 438 then enter and engage with the other pair of opposed holes in button B (Fig. 20). At this point the bottom or under-face of button B contacts the end of plug 434 of shaft 414 and pins 432 due to their resilient support provided by spring 428 have retracted into the hollow portion of shaft 414 with only their points in contact with the holes of the button.

Upon continued forward motion of shaft 414 the button is pushed out of engagement with resilient retaining pins 402 at the bottom of button clip R, and positioned between jaws 302 of the button chuck which were opened by the operator when she depressed the right foot treadle 340, described hereinabove. When shaft 414 with a button supported on prongs 438 reaches its forwardmost or button delivery position, the operator releases pressure on right foot treadle 340. This action results in a closing of button chuck jaws 302, which grip opposite sides of the button held supported on prongs 438. As soon as the button is gripped by jaws 302, the operator removes pressure on left foot treadle 456 and because of the action of tension spring 460, shaft 414 retreats and revolves in a reverse direction to its original starting position.

The button ejecting mechanism embodying the insertion and shown in the drawings and described hereinabove performs the dual functions of transferring the buttons from the button clip R to the button chuck, and also orients each button so that the holes therein are in proper position for sewing when the button is gripped by jaws 302 of the button chuck K.

An important feature of the machine is the provision of automatic mechanism for rapidly threading the machine. This mechanism makes it possible to operate the machine more efficiently, and results in a saving in time. A preferred form of threading mechanism selected for purposes of illustration is shown in Figures 23, 25 and 26. The needle threader designated generally E, consists of a threader arm 470 adjustably mounted on a horizontal shaft 472 provided with a threader hook 474 on its front face. Shaft 472 is rotatably and slidingly supported in a bearing housing 476 secured to the vertical member of the main base 50. Attached to shaft 472 and located in housing 476 is a wide or spline gear 478 which meshes with gear rack 480 slidably supported in suitable grooves in housing 476. A cross-bar or rod 482 preferably formed integrally with rack 480 extends outwardly from both sides of rack 480. Fastened to each end of rod 482 is one end of a spring 484, the other end of which is secured to a post 486 projecting from an actuating member 488. This member is in slidable engagement with the free end of rack 480. The free end of actuating member 488 is secured to one end of flexible cable 490. The other end of cable 490 is suitably secured to arm 448 which, as described heretofore, is connected to and operated by foot treadle 456. Rack 480 on its full length top surface is provided with a groove 492 in which is slidably supported a bar 494 having one end attached by a pin 496 (Figure 25) to actuating member 488. The other or free end of bar 494 is provided with an upwardly extending projection 498. The top surface of bar 494 is preferably flush with that of rack 480. Extending above the top surfaces of bar 494 and rack 480 is an arm 500 of a bell crank lever 502 pivotally supported on a stud shaft 504 held in a suitable boss of the housing 476. The other arm 506 of bell crank lever 502 is formed with a fork or yoke which engages with a clutch collar 508 which is suitably secured to shaft 472. A tension spring 510 surrounding shaft 472 and confined between the forward flange of collar 508 and a recess in the inner wall of housing 476 normally maintains shaft 472 in its normal retracted position.

Adjustably secured to the end of shaft 472 which extends from the rear of housing 476 is a suitably shaped lug 512. This lug, when shaft 472 is in its normal retracted position, contacts and is in engagement with a stop pin 514 projecting from the rear end of housing 476, as shown in Fig. 23. Another, shorter guide pin 516 the function of which will be described hereinafter, also projects from the rear end of housing 476.

The front face of threader arm 470 also carries a thread clamping spring leaf 518 provided with a hole 520, Fig. 23, through which the shank portion of threader hook 474 can project. During normal or "in action" position the free end of thread clamping spring leaf 518 is in engagement with and held depressed beneath the angular shaped end of a stationary depresser plate 522 (Fig. 23) projecting from and secured to cross bar 384 of the button clip receiving device D, described hereinabove.

The automatic needle threading device described above operates as follows: As the operator depresses the left foot treadle 456, flexible cable 490 transmits a pulling action to member 488 which through posts 486, springs 484 and cross rod 482 moves rack 480. Movement of rack 480 across the gear 478 effects a turning of shaft 472 which continues until lug 512 thereon moves into contact with the under side of stop pin 514 and is arrested, as illustrated in Fig. 25. As shaft 472 turns, threader arm 470 also turns and spring leaf 518 disengages from depresser plate 522 and engages with the bent-up portion of the threader hook 474. When turning movement of shaft 472 is arrested hook 474 is exactly in line with the eye of needle 142 which at that moment is held in upper needle bar 58. Due to the springs 484 connected to rack 480, pulling motion may be continued although movement of rack 480 and shaft 472 has ceased. Thus motion now through pin 496 is transmitted to bar 494 and projection 498 thereon engages with the free end of arm 500 of bell crank lever 502 and rocks the latter to a position shown in dotted lines in Fig. 25. This motion causes the forked arm 506 of bell crank lever 502 to move in a counterclockwise direction as viewed in Fig. 25, and push clutch collar 508 and shaft 472 forwardly. This forward movement of shaft 472 also includes threader arm 470 which is mounted thereon, and since the threader hook 474 is exactly in line with the eye of needle 142, threader hook 474 passes directly through the needle eye. Thus the operator is able to place one end E of a pre-cut length of thread T over hook 474 while the end of leaf spring 518 is depressed onto the front face of threader arm 470 as shown in dotted lines in Fig. 25. In this position lug 512 in contact with the underside of stop pin 514 has also moved into engagement with short pin 516 which insures the elimination of rotary movement of shaft 472 on arm 470 as the hook 474 enters the needle eye.

As soon as foot treadle 456 is released by the operator, threader hook 474 with end E of the thread T retreats through the needle eye and the free end of the spring leaf 518 clamps end E of thread T against the bent up portion of the hook 474. Arm 470 and shaft 472 due to the action of spring 510 retreat first in a straight rearward motion until projection 498 of bar 494 disengages from arm 500 of bell crank lever 502 and lug 512 has moved out of engagement with the short guide pin 516. The continued reverse movement of cable 490 and member 488 effect a reversing movement of rack 480 and the gear 478 and also a reverse rotary movement of shaft 472 and threader arm 470. During the rotary return motion of arm 470, that portion of thread T which lies between the needle eye, because of the movement of threader hook 474 on arm 470, is positioned in or anchored in a suitably shaped retainer hook 524 projecting from one of the jaws 302 of the button chuck as illustrated in Fig. 23. Shaft 472 and arm 470 return to their original dwell position where the spring leaf 518 again engages with and is depressed by the depression plate 522, and spring leaf 518 then releases end E of the thread T from its clamped position. The short or loose end of the thread now being engaged by the retainer hook 524 makes it unnecessary for the operator to hold the loose end of the thread until the thread is locked in the work by the first stitches.

As mentioned hereinbefore, material M to which a button B is sewed is folded over work holder plate 172 which is hinged to work holder supporting member 182 slidably mounted, and is locked to the work table frame 188 during the operation of the machine. In order to unlock work holder supporting member 182 from the work table frame 188 so that it may be moved towards the operator to facilitate placing the material over work holder plate 172, the projecting ends of a pin 526 which secure collar 260 to lock pin 250 engage with the forked ends of an arm 528 pivotally mounted on a stud 530 (Figs. 4 and 7) mounted on work holder supporting member 182. Arm 528 also is provided with a lug 532 from which a pin 534 projects downwardly through a slot 536 in cradle 52. This enables the operator to reach down and pull pin 534 towards her, which effects a withdrawal of the conical end 252 of lock pin 250 from hole 254 of lock plate 256. The operator can then move the entire work holder supporting member 182 towards her for easier manipulation of the work holder plate and material.

While manual unlocking of the work holder supporting member just described may be done at any time or during emergency, unlocking of member during normal operations is done automatically when the operator depresses the right foot treadle 340 shown in Fig. 31. Arm 330 which is actuated by treadle 340 has attached thereto one end of a flexible cable 538, the other end of cable 538 is fastened to a stud member 520 pivotally secured to one end of arm 542 loosely mounted on stud 544 held by a suitable boss 546 on cradle 52. The other end of arm 542 extends towards and in line with arm 528 and carries a block 548 mounted thereon. It is evident that when treadle 340 is depressed it causes flexible cable 538 to pull arm 542 in the direction of the arrow (Fig. 4). Block 548 on arm 542 contacts and depresses lug 532 of arm 528 causing the latter to swing about its pivot 530 and due to its connection with lock pin 250 effecting its disengagement from lock plate 256. Continued pulling motion of cable 538 causes arm 542 to exert further pressure on arm 528 and since lock pin 250 now is clear of plate 256, this results in the movement of the entire work holder member 182 towards the operator, the end of lock pin 250 simply sliding over the face of lock plate 256.

As mentioned hereinabove, material to which buttons are to be sewed is folded over the free end of work holder plate 172, which is then brought into engagement with clamping plate 174 having prongs 176 which hold the folded material firmly upon the edge of the work holder plate 172. One of the prongs 176 is provided with a suitable rib 550 (Figs. 6 and 7) from which extends, substantially at right angles with the length of plate 174, a pin, which may be designated an "Anti-Pucker" pin 552. This pin tends to compress that portion of the material it engages and effect somewhat of a depression in that part of the material M where a button is to be sewed (Fig. 6). Pin 552 also performs important function of preventing the winding of thread during posting operation about the entire length of the sewed loops between the underside of the button and the top of the material. Thus, when button and material are removed from the pin at the conclusion of the sewing and post winding operations, the material can expand outwardly along the unwound portion or roots of the thread forming the loops of thread attaching the button to the work.

After material M is folded over work holder 172 and clamped by plate 174, the operator moves both plates and the work supported thereby downwardly onto work holder supporting member 182, and after releasing foot treadle 340, supporting member 182 is pushed manually by the operator towards the needle bar and button chuck until lock pin 250 under the action of tension spring 258 engages with the hole 254 of plate 256 and locks work holder supporting member 182 to work table frame 188. As member 182 is pushed by the operator towards locking position a stud 554 adjustably mounted in member 182 and projecting downwardly therefrom (Figs. 7 and 8) slides into engagement with switch plate 556 of a microswitch 558 secured to a suitable lug on work table frame 188. Microswitch 558 a part of the electrical control system and is employed as a safety measure to prevent starting of the machine when the work supporting member 182 is not in locked position.

Figure 35:
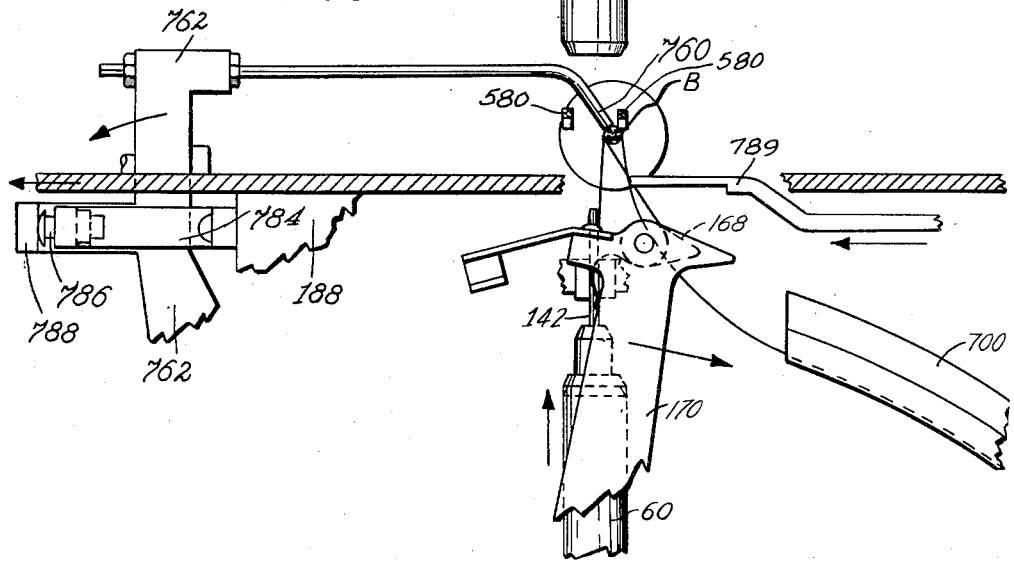
Figs. 35 and 36 are sectional frona elevations illustrating successive steps of the posting operation and the mechanism accomplishing the same.
Figure 36:
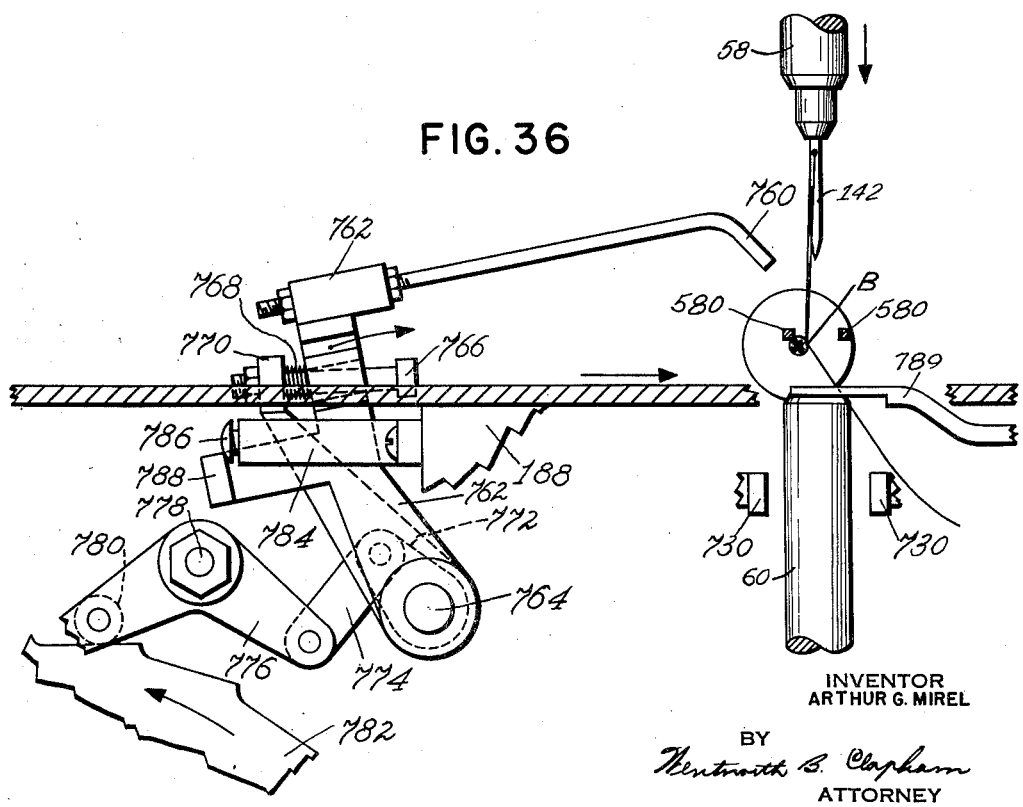

The machine is provided with a presser foot 560 (Figs. 1, 4 and 5) adjustably secured to lug 562 mounted to one end of shaft 564 having its other end secured to the free end of an arm 566 mounted on shaft 568 held by a suitable bearing in upright member 376 of main base 50. An arm 570 also mounted in shaft 568 has its lower end loosely engaging an actuating member 572. The latter carries a tension spring 574 employed for the purpose of maintaining presser foot 560 in its normal downward position which is limited by stop pin 576 projecting from the upright member 376 of main base 50. One end of actuating member 572 is suitably attached to one end of a flexible cable 578, the other end of which is suitably attached to arm 330 (Fig. 31). Arm 330 as mentioned hereinabove is operated and controlled by the right treadle 340, and a depressing thereof will, through flexible cable 578, effect a lifting of the presser foot 560. This foot is provided with a pair of spaced co-planar projections 580, Figures 4 and 5, which assist in preventing unwinding of post wrappings during the post forming operation, and two suitable V-shaped cut-outs 582 which assist in keeping the upper loop of thread straight during sewing operations. As shown in Figures 35 and 36, one of the fingers 580 engages the thread and holds it against the thread attaching the button to the work during each movement of needle 143 during the post wrapping operation.

As described hereinabove, material M is located in sewing position, button B is held by button chuck K, and the needle 142 is threaded, ready to start the sewing cycle. During the operation of the machine, button chuck K is turned from its vertical position to a horizontal position for sewing operation and back to a vertical position for posting by means of a rod 303 connected to a cam lever 305 carrying a cam roller 307 engaging with a cam 309. The rod 303 is pivotally connected to an arm 311 mounted on one of the shafts 298 which carries one of the jaws 302. Cam lever 305 is pivoted to a stud 313 held by the main base 50.

In order to start the machine, the operator lifts starting lever 584 which is pivoted to the front portion of hood 586. This starting movement of the lever 584 energizes solenoid 614 through an electrical control circuit which is described hereinafter. The energization of solenoid 614 causes a plate hinged to a pin 618 to swing outward, which in turn causes a disengagement of pin 588 from arcuate slot 601 in disc 603 and pin 590 to disengage from an arm 592 which is loosely mounted on the extreme end of shaft 90. Since to the lower end of plate 616 is secured an extension 617 which through links 594 is connected to lock bar 596, the latter is also moved and thereby brought beneath lug 598 and lug 599, the latter being secured to link 450 of treadle 456, while lug 598 is secured to link 332 connected to treadle 340, thus providing means for preventing any one depressing the treadle 340 or 456 after the machine is started.

When solenoid 614 is de-energized near the end of the machine cycle of operations, plate 616 falls back onto arm 592 causing the pins 588 to fall into arcuate slot 601 in a disc 603 which is keyed to the driving shaft 90. This engagement causes a sudden stop but since pin 588 also engages and protrudes through arm 592 which is pivoted to the piston rod 605 of a dash-pot 607, the stopping power or energy is quickly dissipated without return action through the unique design of the dash-pot which is provided with variable air fins. The pin 590 also drops in engagement with the arm at the end of the cycle. By means of a hand operated slide bar H, the machine can be run manually through a cycle of operations.

In order to prevent entanglement of the loose end of the thread with thread puller 168, the machine is provided with a thread control mechanism, which is illustrated in Figs. 32 and 33 of the drawings. As the loose end L of the thread T is laid by the thread puller 168 into thread trough 700, it is also laid across a hook-shaped lifter finger 702 which is located in front of said thread trough 700 and which is secured to an arm 704 (Fig. 2) pivotally mounted on a stud 706 on main base 50. The free end of arm 704 carries a cam follower 708 which engages with a cam 710 mounted on cam shaft 90. As soon as the loose end of the thread is deposited over finger 702, the latter by means of cam 710 and arm 704 is moved upwardly as well as rearwardly, causing that portion of the thread which passes through the material to engage with a stationary thread guide lug 712, and a suitably shaped trap 714, attached to block 716, preferably formed integrally with a member 718 (Fig. 34) secured to main base 50. In order to guide the thread into trap 714 and prevent it from slipping out of the same, a suitably shaped lock finger 720 works in conjunction with and follows the lifter finger 702 as soon as the latter starts to move backward.

Lock finger 720 is mounted on a stud shaft 722 which is loosely supported in the lower portion of trap 714. Lock finger 720 is also provided with plate or lug 724, the top edge of which is in engagement with the lower front edge of lifter finger 702 which holds lock finger 720 in upright position as long as finger 702 is in its foremost position. As soon as the latter moves rearwardly, a suitable tension spring 726 urges lock finger 720 rearwardly until the top edge of plate 724 engages the front edge of the lower portion of the trap 714 and the trap is closed.

To assure the proper formation of a loop while the needle is in the lower needle bar a pair of gripper fingers 730 (Fig. 34) are provided to engage with the thread after the lower needle bar 60 has reached its lowermost position and starts to move slightly higher to its dwell position. Fingers 730 are similar in construction and operation to those disclosed in Pedersen Patent 2,523,054. Each gripper finger 730 is mounted on a shaft 732, to each of which is secured a gear 734, both of which mesh with each other and one of which engages with a gear rack 736 which is integral with a horizontal shaft 738 slidably supported in suitable bearings of the main base 50. The shaft 738 at its rear end carries a pin 740 (Fig. 2) which engages with a slot 742 provided in the free end of an arm 744 pivotally mounted to a stud 746 held by the main base 50. To the lower end of arm 744 is pivoted a cam roller which engages with a cam 750 mounted on the shaft 90. A tension spring 752 (Fig. 2) acting on arm 744, is provided to keep cam roller 748 in constant contact with the cam 750. The gripper fingers 730 are open at all times with the exception mentioned heretofore. An adjustable stop screw (Fig. 34) held by block 716 is provided for proper closing adjustment.

To prevent the unwinding or back coiling of the thread during posting operation, a brake or tension mechanism is provided, see Figs. 35 and 36. The end of a suitably shaped rod 760 engages the winding of the thread about the loops connecting the button to the work when the needle is in the lower needle bar and the latter reaches its lowermost point and slightly ascends to its dwell position. It is during this upward movement that any possible unwinding or uncoiling may take place. Brake rod 760 is adjustably mounted on the free end of arm 762 which is pivotally mounted on stud shaft 764 rotatably held in a suitable bearing in main base 50. Arm 762 by means of stud 766 and tension spring 768 is yieldingly connected to a lever 770 mounted on stud shaft 764. Also secured to shaft 764 is an arm 772 which through a link 744, is connected to cam lever 776 pivotally mounted on a stud 778 and which on its free end carries a cam roller 780 engaging a cam 782 mounted on cam shaft 160.

In order to provide means to quickly move brake rod 760 out of the way when the lower needle bar ascends, the work table frame 188 carries a bracket or arm 784 which on its free end carries a suitable stud or bumper 786. The latter during the left sideward motion of table frame 188, contacts a lug 788 projecting from arm 762 and thus quickly moves rod 760 out of the path of the ascending needle. This movement of arm 762 is made possible due to its yielding connection with lever 770.

An additional thread tension finger 789 is provided to properly tension the loose end of the thread to prevent unwinding and uncoiling of the loose end of the thread posting operation. Finger 789 is mounted on the free end of horizontal shaft 790 slidably supported in suitable brackets 792 on main base 50. Secured to shaft 790 is an arm 794 which by means of a suitable yielding member 796, is connected to a rod 798, the free end of which is pivoted to the free end of cam lever 800. The latter is pivoted on a stud 802 and carries on its lower end a cam roller 804 which engages with cam 806 on shaft 160 (Fig. 1). An extension 791 (Figure 1B) of shaft 790 led to the outside of cradle 52 and provided with a threaded end 793 and a knob 795, permits adjustment of the tension finger 789 to any desirable degree merely by turning knob 795 in one direction or the other.

Figure 37:
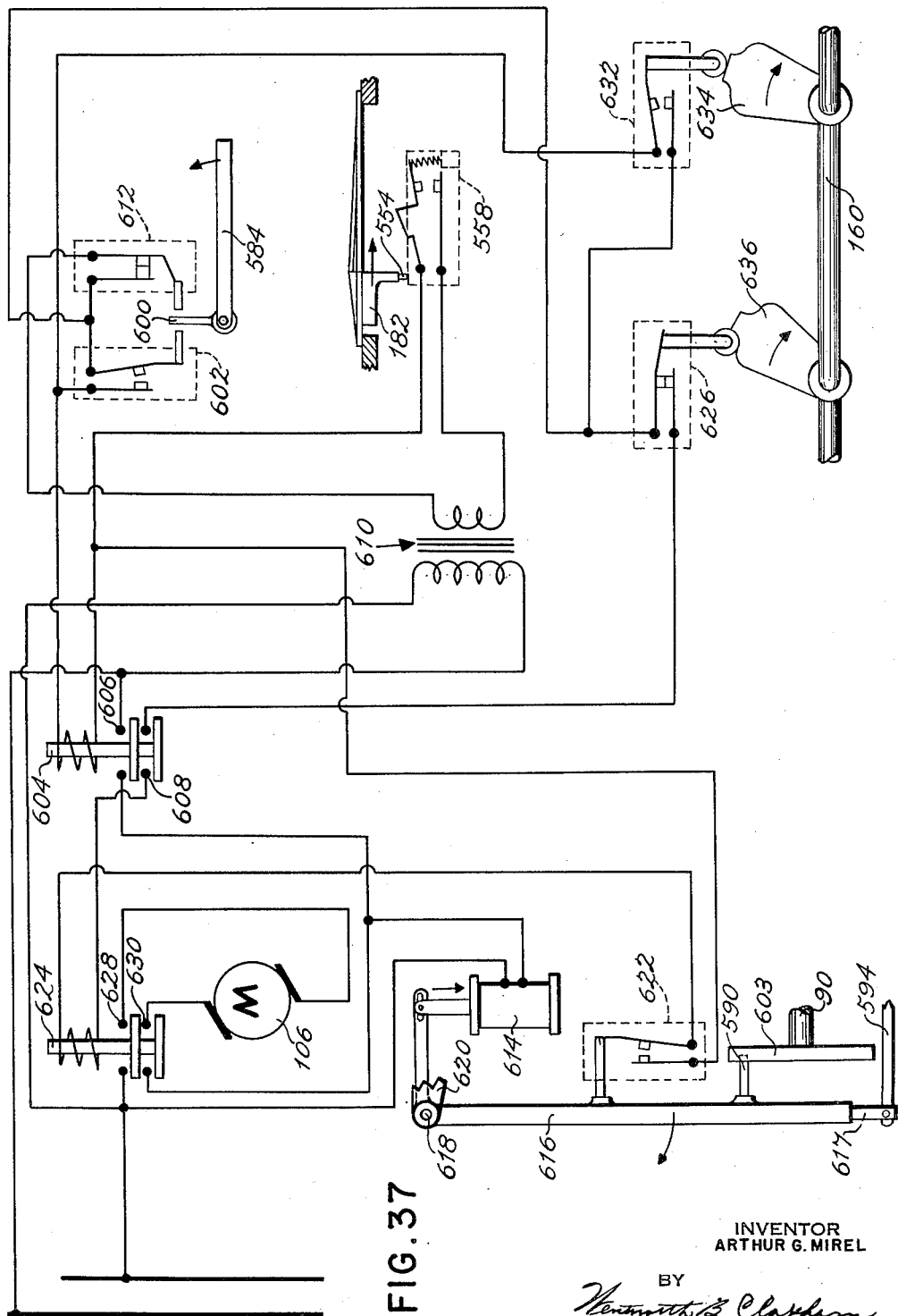
Fig. 37 is a wiring diagram of a suitable electric control.

The operator starts the machine by lifting the starting lever 584 in the direction indicated by the arrow on Fig. 37. This causes a trip finger 600 provided at the end of lever 584 to momentarily close the contacts of starting switch 602 which energizes the coil of relay 604 through SW 558, the contacts of which were previously closed by the operator moving the work holder forward into sewing position. The contacts of switch 558 remain closed during the entire cycle. Energizing the coil 604 closes the two sets of normally open contacts 606 and 608 with which the relay is provided.

Power is supplied to the starting switch 602 from step down transformer 610 through normally closed contacts of the emergency stop switch 612. Transformer 610 is supplied from a conventional power source.

Closing contacts 606 energizes solenoid 614 which causes plate 616 to move outwardly, pivoting on shaft 618 which is supported in a bracket 620 fastened to the main casting. This movement of plate 616 closes the normally open contacts of switch 622. Closing the contacts of switch 622 energizes the coil of relay 624 through the previously closed contacts 608 and the normally closed contacts of switch 626. Energizing the coil of relay 624 closes both sets of contacts, 628 and 630 which energizes the motor 106 through previously closed contacts 606.

Shortly after the motor 106 is energized, and the machine starts its cycle, the normally open contacts of switch 632 are closed due to the rotation of cam 634 located on main shaft 160. Switch 632 keeps solenoid 614 energized during the major portion of the cycle, after the solenoid was momentarily energized by lifting starter lever 584.

Near the end of the sewing cycle, it is necessary to cut out the motor to avoid driving the machine unnecessarily when it is now desired to stop it at the end of the cycle by means of the stop mechanism located at the rear of the machine. This is accomplished by means of switch 626. The normally closed contacts of switch 626 are opened by cam 636 mounted on shaft 160. The cam opens the contacts near the end of the cycle, cutting out the motor. Shortly after switch 626 opens, switch 632 opens, de-energizing solenoid 614, and opening switch 622.

When the machine stops at the end of the cycle the contacts of switch 626 are closed by cam 636 in preparation for the next cycle. The open contacts of switch 622 prevent self-restarting of the motor at this point.

In the event of an emergency, the operator moves starting lever 584 downwardly. This causes trip finger 600 to open the contacts of emergency stop switch 612, and by de-energizing relays 604 and 624, cuts out the motor and de-energizes the solenoid 614, quickly stopping the machine.

In a similar manner, moving the work holder backwards out of sewing position during the cycle opens the contacts of switch 558 also de-energizing relays 604 and 624 and quickly stopping the machine.

The invention above described may be varied in construction within the scope of the claims, for the particular device, selected to illustrate the invention, is but one of many possible concrete embodiments of the same. It is not, therefore, to be restricted to the precise details of the structure shown and described.

What I claim is:

1. A button sewing machine for sewing buttons to material in a manner simulating hand sewing, comprising a work support table, an upper and a lower needle bar located on opposite sides of said table, independent driving means for each of said needle bars adapted to alternately project a needle having a thread with a loose end back and forth through selected holes in a button, a thread puller operating in timed relation with said bars for pulling the loose end of said thread through said work and button, means for operating said thread puller, a button holder mounted on said table, mechanism for effecting relative movement between said table and said needle in planes substantially at right angles to each other to dispose said work and button held in said button holder in the path of travel of said needle, mechanism for operating said bars to pass said needle in one direction completely through a selected hole in said button and said work, and in the opposite direction through a selected hole in said button only, whereby said button is attached to said work by a single continuous thread forming a plurality of continuous closed loops.

2. A button sewing machine comprising a work supporting table, a button holding member mounted on said table, a device for projecting a needle and a thread back and forth through selected holes in said button and said work, a support plate on said table for holding material to which a button is to be sewed on said table, mechanism for moving said table in a substantially figure eight path of travel relative to said needle and positioning selected holes in said button in alignment with said needle, means for positioning said button holding member and a button held therein in a plane substantially parallel to the work during the operation of sewing a button to said work, means for moving said button holding member and said button into a plane substantially at right angles to the plane of said work after said button has been sewed to said work, and means operative while said button is held by said button holding member in said plane substantially at right angles to the plane of said work for moving said needle up and down alongside of the loops of thread attaching said button to said work to wind said loops and form a post or shank encircling said loops attaching said button to said work, and means operative during the winding of said thread about said loops for preventing the unwinding thereof.

3. A button sewing machine for sewing buttons to material in a manner simulating hand sewing, comprising a work support table, an upper and a lower needle bar located on opposite sides of said support and adapted to alternately project a double pointed needle and a thread with a loose end, back and forth through selected holes in a button, a thread puller operating in timed relation with said bars for pulling the loose end of said thread through said work and button, a button holder mounted on said table, a looper mounted above said table, mechanism for moving said table to dispose said work and button held in said button holder in the path of travel of said needle, mechanism for operating said bars and thread puller in timed relation with the movement of said table and button holder to pass said needle in one direction completely through a selected hole in said button and said work, and in the opposite direction through a selected hole in said button only, whereby said button is attached to said work by a single continuous thread forming a plurality of continuous closed loops, means for turning said button holder to move said button along said loops of thread attaching said button to said work and locate said button in a plane substantially at right angles to the plane of said work on said table, means for moving said looper to engage loop portions of said thread above said work during the stitching of said button to said work, and means for incapacitating said looper prior to operation of said button holder turning means.

4. The machine defined in claim 3 including mechanism operative in response to the actuation of said means for turning said button holder for moving said table in a straight line of movement relative to said needle and alternately locating opposite sides of said loops of thread attaching said button to said work in the path of travel of said needle, whereby said needle winds a plurality of windings about said loops of thread attaching said button to said work, a detachably mounted button supply device, means for orienting a button removed from said device and delivered to said button holder, and means for operating said button holder to receive and hold an oriented button, with a selected button hole, located in the path of travel of said needle for attachment to said work.

5. A button sewing machine for sewing buttons to work in a manner simulating hand sewing, comprising a work support table, an upper and a lower needle bar located on opposite sides of said table, separate driving means for each of said needle bars, said means including a driven shaft, a toothed pulley on each shaft, an endless driving belt provided with teeth engaging said toothed pulleys, a needle bar driving cam on each of said shafts, means for rotating said shafts and cams to alternately project a needle, having a sharp end and a blunt end, threaded with a thread with a loose end back and forth through selected holes in a button, a thread puller operating in timed relation with said bars for pulling the loose end of said thread through said work and button, a button holder mounted on said table, mechanism for moving said table and button holder to dispose said work and button held in said button holder in the path of travel of said needle, mechanism for operating said bars and thread puller in timed relation with the movement of said table and button holder to pass said sharp end of said needle in one direction completely through a selected hole in said button and said work, and the blunt end of said needle in the opposite direction through a selected hole only in said button, whereby said button is attached to said work by a single continuous thread forming a plurality of continuous closed loops.

6. A button sewing machine comprising a work supporting table, a button holding member, a device for projecting a needle and a thread back and forth through holes in said button and said work, means for holding material to which a button is to be sewed on said table, mechanism for moving said table in a substantially four motion path of travel relative to said needle for positioning selected holes in said button in alignment with said needle, means for positioning said button holding member and a button held therein above said work and in a plane substatially parallel to the work during the operation of sewing a button to said work, means for locating said button holding member and said button in a plane substantially at right angles to the plane of said work after said button has been sewed to said work, means operative while said button is held by said button holding member in said plane substantially at right angles to the plane of said work for moving said needle up and down alongside of the loops of thread attaching said button to said work to wind said loops, a device operative during the winding of said loops for holding the wound thread against the loops of thread connecting the button to said material, and means for locking said winding thread in said post formed by said loops and windings.

7. The invention defined in claim 6, wherein said device includes a finger, a movable support for said finger, and means operative in response to the movement of said needle in one direction of movement in winding said thread about said looper for moving said support to press said finger against said windings on said loops.

8. A button sewing machine comprising a work supporting table, a button holding member mounted on said table, a device for projecting a needle and a thread back and forth through selected holes in said button and said work, a support plate on said table for holding material to which a button is to be sewed on said table, mechanism for moving said table in a substantially figure eight path of travel relative to said needle and positioning selected holes in said button in alignment with said needle, means for positioning said button holding member and a button held therein in a plane substantially parallel to the work during the operation of sewing a button to said work, means for moving said button holding member and said button into a plane substantially at right angles to the plane of said work after said button has been sewed to said work, and means operative while said button is held by said button holding member in said plane substantially at right angles to the plane of said work for moving said needle up and down alongside of the loops of thread attaching said button to said work to wind said loops and form a post or shank encircling said loops attaching said button to said work, and means operative during the winding of said thread about said loops for preventing the unwinding thereof.

9. The invention defined in claim 1 comprising mechanism for stopping said machine and positioning said needle bars in predetermined positions ready for the next cycle of operations, said mechanism including a fluid pressure energy dissipating mechanism operatively connected with said machine.

10. In a sewing machine having a material work support table, a device for projecting a needle and a thread back and forth through work on said table to secure a button thereto, a button chuck mounted on said work table, means normally positioning said button chuck in a plane inclined to the vertical to provide clearance for the unobstructed movement of said device relative to said button chuck, means for moving said button chuck and a button held therein into a plane spaced above and substantially parallel to said table, means for actuating said device, and means for locating selected holes in said button for movement of said needle therethrough to sew said button to said work.

11. The machine defined in claim 10 including means for moving said button chuck to locate a button held in said chuck and attached to said work at substantially right angles to the plane of said table, means for moving said table laterally back and forth relative to the path of travel of said needle during the movement of said needle up and down alongside of the loops of thread securing said button to said work for winding a plurality of loops of thread about the loops of thread connecting said button to said work thereby forming a shank supporting said button away from said work, and means on said table adapted to engage said loops of thread adjacent the work during the formation of said shank to prevent puckering of said work at the base of said shank.

12. A button sewing machine for sewing buttons to material in a manner simulating hand sewing, comprising a work support table, an upper and a lower needle bar located on opposite sides of said support and adapted to alternately project a double pointed needle and a thread with a loose end back and forth through selected holes in a button, means mounting said table for movement in a closed path of movement to position said selected button holes successively in the path of movement of said needle, a pair of pivotally mounted work supporting and clamping plates mounted on said table, work clamping prongs on one end of one of said plates for firmly holding that portion of the work to which a button is to be sewed, a thread puller operating in timed relation with said bars for pulling the loose end of said thread through said work and button, a button holder mounted on said table, a looper mounted above said table, mechanism for moving said table to dispose said work and a selected button hole in the path of travel of said needle, mechanism for operating said bars and thread puller in timed relation with the movement of said table and button holder to pass said needle in one direction completely through a selected hole in said button and said work, and in the opposite direction through a selected hole in said button only, whereby said button is attached to said work by a single continuous thread forming a plurality of continuous closed loops, means for turning said button holder to move said button along said loops of thread attaching said button to said work and locate said button in a plane substantially at right angles to the plane of said work on said table.

13. The invention defined in claim 12 wherein one of said plates is adapted to support said work with the portion of said work to which a button is to be sewed, and wherein said other plate including said prongs clamps and holds said work on said first named plate, and a transverse pressing element mounted on one of said prongs for compressing a portion of said folded work during sewing operations.

14. The invention defined in claim 1 wherein said means for holding said material on said work support table includes clamps for holding a folded part of the material in the path of travel of said needle, and means for compressing a portion of said folded part of said material during sewing and post forming operations, whereby when said means is removed, said material can expand and substantially eliminate puckering of said material at the base of said post.

15. The invention defined in claim 14, including means operative in response to the completion of a predetermined number of loops securing said button to said work for turning said button holder to position said button in a plane substantially at right angles with the plane of said work support table, means operative while said button is thus positioned for moving said needle back and forth alongside the loops of thread attaching said button to said work to wind said thread about said loops, means for tensioning each of said windings, means for preventing unwinding of each winding of thread about said loops, and means for securing said windings to complete the formation of a button supporting post.

16. A button sewing machine comprising a work supporting table, a movably mounted plate carried by said table for supporting the folded edge of work to which a button is to be attached beyond said table, a second movably mounted plate carried by said table and coacting with said first-named plate for clamping said work against movement, means mounting said table for movement towards the path of travel of said needle, means securing said table in operative sewing position, a device for supporting a button above the folded edge of said work, a needle bar supporting a threaded needle for passage through selected holes of said button and said folded edge of said work, and means for moving said needle bar and said table to travel said needle and said thread alternately through a selected button hole and said folded edge of said work in one direction of movement, and through a selected button hole only on another movement of said needle whereby to secure said button to said work.

17. The invention defined in claim 16 wherein there is provided means for varying the length of loops of thread connecting a button to the work, said means comprising loop length adjusting means mounted on said table, and an element on said first-named plate adapted to engage said means for supporting said plates at a predetermined elevation on said table.

18. A button sewing machine comprising a work supporting table, movably mounted means carried by said table for supporting the folded edge of work to which a button is to be attached beyond said table, adjusting means for positioning said work supporting means at a predetermined elevation on said table, a device for supporting a button above said work with selected button holes located above the folded edge of said work, a needle bar supporting a threaded needle for passage through selected holes of said button and said folded edge of said work, and means for moving said needle bar and said table to travel said needle and said thread alternately through a selected button hole above said folded edge and said folded edge of said work in one direction of movement, and through a selected button hole only on another movement of said needle whereby to secure said button to said work by a plurality of continuous loops of a predetermined length.

19. The invention defined in claim 18 wherein said needle carries a single diminishable length of thread through said work and said button, and said thread has a loose end, a thread anchoring device mounted on said button supporting device, and means for locating one end of said thread in said anchoring device.

20. A button sewing machine comprising means for supporting an article to which a button is to be sewed for movement into and out of the path of travel of a needle, a device for holding a button above said article, means for projecting a needle and a thread back and forth through the holes in said button to attach said button to said article, means for moving said device to locate said button in a plane substantially at right angles to the plane of said article, means operative while said button is held in said last-named plane by said device for locating the sides of the loops of thread connecting said button to said article alternately in the path of movement of said needle, said needle thereby winding a plurality of continuous loops of thread about said first-named loops and forming a thread post supporting said button away from said article, means for tensioning each of said winding loops, and means for compressing a portion of said work to susbtantially eliminate puckering at the base of said thread post.

21. The invention defined in claim 16 including mechanism for adjusting the forward position of work to which buttons are to be attached on said work table, said mechanism including an abutment on said work table, an adjusting element mounted in the path of movement of said abutment and adapted to be engaged thereby.

22. A button sewing machine comprising, a needle bar supporting a threaded needle for passage through selected holes of said button and said work, a work table supporting frame, means for moving said frame in a predetermined path of motion, a work supporting table movably mounted on said frame, work holding means carried by said table, means mounting said table for movement on said frame into a predetermined position relative to the path of travel of said needle of said machine, a device for supporting a button above said work, means for moving said needle bar and said table to travel said needle and said thread alternately through a selected button hole and said work in one direction of movement, and through a selected button hole only on another movement of said needle whereby to secure said button to said work, and mechanism for adjusting the forward position of said table on said frame, said mechanism including a member provided with a plurality of adjusting elements, and means for moving said member to locate a selected element in position to be engaged by said table when located in its forward sewing position.

23. The invention defined in claim 22 wherein there is provided mechanism for controlling the length of thread loop connecting the button to said work, said mechanism comprising an abutment mounted on said work holding means, an adjusting device movably mounted in said frame beneath said work holding means and provided with a plurality of adjusting elements each having a different height, and means for moving said device to position a selected adjusting element for engagement by said abutment.

24. The invention defined in claim 22 including mechanism for locking said table on said frame, said mechanism comprising a locking recess on said frame, a locking member movably mounted on said arm and adapted to engage said recess when said table is located in sewing position, and means urging said member into locking engagement with said recess.

25. The invention defined in claim 24 including means for preventing the operation of said machine until said table is locked in sewing position, said means comprising an electric operating circuit, a switch in said circuit mounted on said work table supporting frame, and means on said work table adapted to engage said switch and actuate said circuit when said table is locked in said sewing position.

26. A button sewing machine for sewing buttons to work in a manner simulating hand sewing, comprising a work support table, an upper and a lower needle bar located on opposite sides of said support and adapted to alternately project a needle, having a sharp end and a blunt end, threaded with a thread with a loose end back and forth through selected holes in a button, a thread puller operating in timed relation with said bars for pulling the loose end of said thread through said work and button, a button holder mounted on said table, means positioning said button holder in a button receiving position, a button clip adapted to hold a plurality of buttons, a support detachably mounting said clip, a device for removing a button from said clip and for orienting said holes of said button and delivering said button to said button holder, means for moving said button holder and a button held therein from said receiving position to a button sewing position relative to said work, mechanism for moving said table and button holder to dispose said work and button held in said button holder in the path of travel of said needle, and mechanism for operating said bars and thread puller in timed relation with the movement of said table and button holder to pass said sharp end of said needle in one direction completely through a selected hole in said button and said work, and the blunt end of said needle in the opposite direction through a selected hole only in said button, whereby said button is attached to said work by a single continuous thread forming a plurality of continuous closed loops.

27. A button sewing machine for sewing buttons to material in a manner simulating hand sewing, comprising a work support table, an upper and a lower needle bar located on opposite sides of said support and adapted to alternately project a double pointed needle and a thread with a loose end back and forth through selected holes in a button, means for automatically threading said needle, a thread puller operating in timed relation with said bars for pulling the loose end of said thread through said work and button, a button holder mounted on said table, a source of supply for buttons, means for feeding buttons from said source of supply into said button holder, a looper mounted above said table, mechanism for moving said table to dispose said work and button held in said button holder in the path of travel of said needle, means for anchoring one end of said thread on said thread holder, mechanism for operating said bars and thread puller in timed relation with the movement of said table and button holder to pass said needle in one direction completely through a selected hole in said button and said work, and in the opposite direction through a selected hole in said button only, whereby said button is attached to said work by a single continuous thread forming a plurality of continuous closed loops, means for turning said button holder to move said button along said loops of thread attaching said button to said work and locate said button in a plane substantially at right angles to the plane of said work on said table, means for moving said looper to engage loop portions of said thread above said work during the stitching of said button to said work, and means for incapacitating said looper prior to operation of said button holder turning means.

28. A threading mechanism for a sewing machine having a needle bar and means for passing a needle and a thread back and forth through material to be sewed, comprising a threader arm, a shaft supporting said arm for rotation therewith, a threader hook mounted on one end of said arm and extending outwardly substantially at right angles therefrom, an elongated resilient flat spring member fixed to said arm and provided with an opening adjacent its free end through which said threader hook projects, means rotatably supporting said shaft, a housing carried by said supporting means, an elongated gear located within said housing and mounted on said shaft, a rack meshing with said gear, resilient connecting means attached to said rack, a flexible cable having one end attached to said resilient connecting means, treadle actuated operating means, means connecting the other end of said flexible cable to said treadle actuating means for pulling said flexible cable, a stop member secured to said shaft, a stop pin projecting from said housing and normally adapted to be engaged on one side by said stop member, said shaft being operative in response to the depressing of said treadle actuated operating means and the pulling movement imparted to said flexible cable for rotating said threader arm whereby said stop member is turned and brought into engagement with the opposite side of said stop member to locate said threader hook in position to be moved through the eye of said needle.

29. The mechanism defined in claim 28 wherein the free end of said resilient flat member is normally held by a fixed depressing element, and means for moving said shaft axially subsequent to the engagement of said stop member with the underside of said stop pin for moving said threader hook through the eye of said needle.

30. The threading mechanism defined in claim 28 including a push clutch collar fixed to said shaft, a bell crank lever, one arm of said bell crank lever engaging said push clutch collar, an elongated bar slidably mounted on said rack, a pin at one end of said bar secured to said resilient connecting means, an upstanding projection on the other end of said bar, adapted to engage the other arm of said bell crank lever, in response to the movement of said bar during continued pulling of said cable subsequent to the interruption of rotation of said shaft, whereby said first-named arm engaging said collar moves said shaft axially to pass said threader hook through the eye of said needle into position to receive an end portion of a length of thread, and means operative in response to the release of pressure on said treadle actuated operating means for withdrawing said threader hook and thread supported thereby through said eye of said needle for threading same.

31. The invention defined in claim 30 including a pair of opposed button chucks adapted to support a button for movement into sewing position relative to work to which said button is to be attached, and means on one of said button chucks operative in response to the rotation of said threader arm for receiving and holding one end of said thread.

32. The machine defined in claim 6, including a presser foot, means mounting said presser foot for applying yielding pressure against said work to which said button is being sewed, said presser foot having two spaced substantially parallel coplanar fingers, each of said fingers being adapted for alternate engagement with opposite sides of said loops of thread connecting said button to said work during the formation of windings about said loops for assisting in preventing the unwinding thereof.

33. Button supporting and orienting mechanism for use in a button sewing machine comprising a support bracket, an elongated shaft mounted in said bracket for axial and rotary movement, said shaft being provided with an elongated hollow portion, a cam track on the exterior of said shaft, a stationary cam follower adapted to engage said shaft, a member slidably mounted in said hollow portion, a spring located in said hollow member at the rear of said member and adapted to urge said member towards the open end of said hollow portion, a block in the open end of said hollow portion of said shaft securing member within said hollow portion, a pair of elongated pins fixed to said piston-like member and provided with tapered points extending through bores in said block, a pair of spaced prongs mounted on said block, means for moving said hollow shaft forwardly to engage said tapered ends of said pins with the bottom of a button, and simultaneously rotate said shaft to cause said tapered ends of said pins to enter said opposed pair of button holes, and means for continuing the forward movement of said hollow shaft to engage and pass said prongs into the opposite pair of button holes to securely hold a button for further forward movement with said shaft.

34. In a button sewing machine, a source of supply of buttons comprising an elongated support member, a support for said member, a pair of yieldingly mounted gripping bars extending along opposite sides of said member, a removable elongated button clip adapted to be detachably positioned between said bars and be held thereby, means in said clip for securing a plurality of buttons in side by side alignment, means operative in response to the insertion of said clip between said members for releasing the foremost button in said clip for gravity movement therefrom, and support means adapted to support said last-named button.

35. In a button sewing machine, a source of supply of buttons comprising an elongated support member, a support for said member, a pair of yieldingly mounted gripping bars extending along opposite sides of said member, a removable elongated button clip adapted to be detachably positioned between said bars and be held thereby, means in said clip for securing a plurality of buttons in side by side alignment, means operative in response to the insertion of said clip between said members for releasing the foremost button in said clip for gravity movement therefrom, support means adapted to support said last-named button for movement thereof to a point of delivery, a button chuck located at said point of delivery, means for opening said button chuck to receive a button therebetween, means for closing said chuck to hold said button and means for retracting said device leaving said button held in said chuck.

36. In a button sewing machine, a removable button clip comprising an elongated channel having spaced side walls securing a plurality of buttons therein against substantial lateral movement, spring means at each end of said channel normally securing buttons in said channel against removal, said channel having a cut out portion at one end, and one of said spring means being located adjacent said cut out portion; a support for said clip, means operative in response to the insertion of said clip in said support for moving said spring means adjacent said cut out portion to release the button adjacent thereto for delivery from said clip, and resiliently mounted means adjacent said cut out portion for holding said last-named button for delivery therebetween.

37. A button sewing machine for sewing buttons to material in a manner simulating hand sewing, comprising a work support table, an upper and a lower needle bar located on opposite sides of said table and adapted to alternately project a needle having a thread with a loose end back and forth through selected holes in a button, a presser foot adapted to press said work, an automatic needle threader, a thread puller operating in timed relation with said bars for pulling the loose end of said thread through said work and button, means for operating said thread puller, a button holder including opposed movable jaws mounted on said table, a button handling device to deliver buttons between said jaws, means mounting said table for independent movement to and from said path of movement of said needle, mechanism for effecting relative movement between said table and said needle in planes substantially at right angles to each other to dispose said work and button held in said button holder in the path of travel of said needle, mechanism for operating said bars to pass said needle in one direction completely through a selected hole in said button and said work, and in the opposite direction through a selected hole in said button only, whereby said button is attached to said work by a single continuous thread forming a plurality of continuous closed loops, a first operating treadle, means actuated by said first treadle for opening said jaws of said button holder to receive a button, and lift said presser foot and retract said work table, a second operating treadle, means actuated by said second treadle for moving said button handling device to deliver a button between said open jaws, and to actuate said automatic needle threader, and means operative in response to the release of pressure on said first treadle for closing said jaws to hold a button firmly therebetween, and means for withdrawing said device to free said button therefrom.

38. The invention defined in claim 37 including an electric operating circuit, switch means connected in said circuit, a motor in said circuit, means for closing said switch for starting said motor to actuate said machine, and interlock mechanism including other switch means in said circuit actuated by said table and said switch operating means for preventing operation of said machine until said treadles are released and said work holder table is located in a predetermined operating position.

39. A button chuck mechanism for a button sewing machine comprising a pair of opposed button holding jaws, means normally holding said jaws in closed button holding position, mechanism for opening said jaws to receive a button therebetween, said mechanism including a support for each jaw, a rack secured to each of said supports, a gear engaging each of said racks, means for moving one of said supports to rotate said gear and open both of said jaws, a lug on one of said jaws, and a transverse pin mounted in said lug, a guide on said other jaw and aligned with said pin, said pin and guide coacting to maintain said jaws constantly aligned.

40. A button chuck mechanism for a button sewing machine comprising a pair of opposed button holding jaws, means normally holding said jaws in closed button holding position, mechanism for opening said jaws to receive a button therebetween, said mechanism including a support for each jaw, a rack secured to each of said supports, a gear engaging each of said racks, means for moving one of said supports to rotate said gear and open both of said jaws, mechanism for supporting said jaws in a substantially vertical plane during delivery of a button therebetween, said mechanism including means for moving said supports to position said jaws with a button held therebetween above work to which a button is to be attached, and means operative in response to the completion of said sewing operation for moving said supports to again position said jaws in said substantially vertical position.

References Cited in the file of this patent

UNITED STATES PATENTS

| | | |
|---|---|---|
| 372,045 | Smith | Oct. 25, 1887 |
| 904,244 | Birch et al. | Nov. 17, 1908 |
| 1,439,918 | Smith | Dec. 26, 1922 |
| 1,903,269 | Ross et al. | Mar. 28, 1933 |
| 1,918,281 | McCann | July 18, 1933 |
| 1,940,229 | Rawnsley | Dec. 19, 1933 |
| 2,096,136 | Reece et al. | Oct. 19, 1937 |
| 2,451,495 | Johnson et al. | Oct. 19, 1948 |